United States Patent
Goldman

(10) Patent No.: US 6,973,353 B1
(45) Date of Patent: Dec. 6, 2005

(54) PROGRAMMABLE CONTROLLER FOR CONTROLLING AN OUTPUT STATE

(76) Inventor: Craig E. Goldman, 11 Woodcrest Rd., Westborough, MA (US) 01581

( * ) Notice: Subject to any disclaimer, the term of this patent is extended or adjusted under 35 U.S.C. 154(b) by 90 days.

(21) Appl. No.: 10/623,102

(22) Filed: Jul. 18, 2003

Related U.S. Application Data

(60) Provisional application No. 60/398,029, filed on Jul. 23, 2002.

(51) Int. Cl.[7] ............................................. G05B 11/01
(52) U.S. Cl. ............................ 700/18; 700/23; 700/58; 700/60; 700/86; 700/87; 318/560; 318/561; 318/567; 318/568.17; 318/568.23
(58) Field of Search .............................. 700/17, 18, 23, 700/58–60, 83, 86–87, 78, 88, 169, 170, 700/176, 180, 181; 318/560, 561, 567, 568.17, 318/568.23

(56) References Cited

U.S. PATENT DOCUMENTS

| | | | | |
|---|---|---|---|---|
| 4,158,226 A * | 6/1979 | Struger et al. | ................ | 700/13 |
| 5,038,305 A * | 8/1991 | Kumar et al. | ................. | 702/94 |
| 5,227,965 A * | 7/1993 | Klaes et al. | .................. | 700/13 |
| 5,774,968 A * | 7/1998 | Givler | ..................... | 29/243.54 |
| 5,832,005 A * | 11/1998 | Singh | ......................... | 714/805 |
| 6,470,248 B2 * | 10/2002 | Shank et al. | ................. | 701/37 |
| 6,701,277 B2 * | 3/2004 | Coste et al. | ................ | 702/150 |
| 6,757,635 B2 * | 6/2004 | Topmiller | .................. | 702/150 |

* cited by examiner

*Primary Examiner*—Ramesh Patel
(74) *Attorney, Agent, or Firm*—Brian M. Dingman

(57) ABSTRACT

A programmable controller for controlling one or more outputs based on position indicated from a position transducer. The controller includes an interface that converts the transducer signals into a change in position, a transducer position counter that accumulates the change in transducer position, and a net forward position counter that accumulates the net forward position. The position counter updates when the transducer signals indicate a change of position. The net forward position counter updates when the value of the net forward position counter and the value of the transducer position counter are equal and the transducer interface indicates a forward movement. Each controller output has an independent comparator and width counter. The comparator examines the net forward position to determine when to change the output or begin a pulse. The width counter counts down to zero, which ends a pulse.

29 Claims, 18 Drawing Sheets

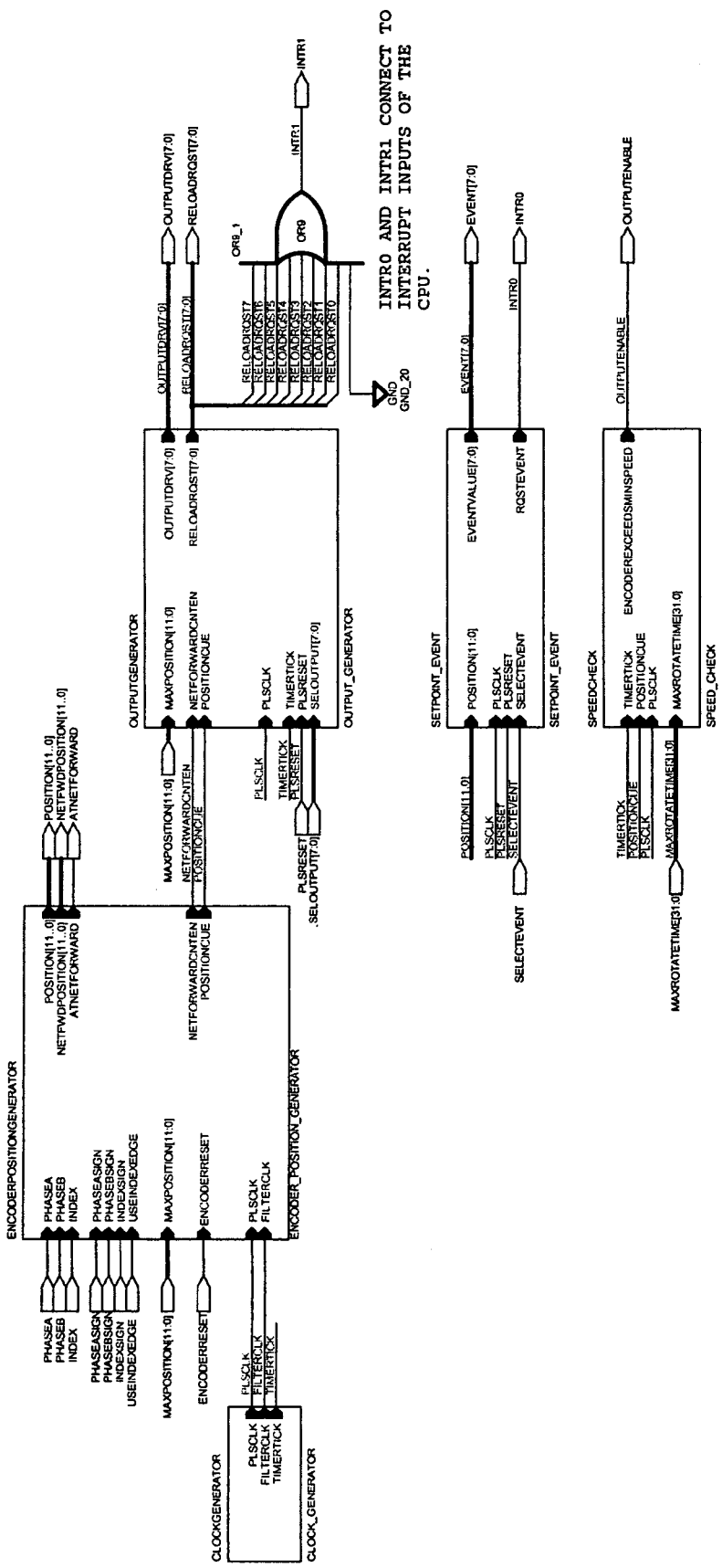
FIGURE 1 -- PROGRAMMABLE PULSE SEQUENCER

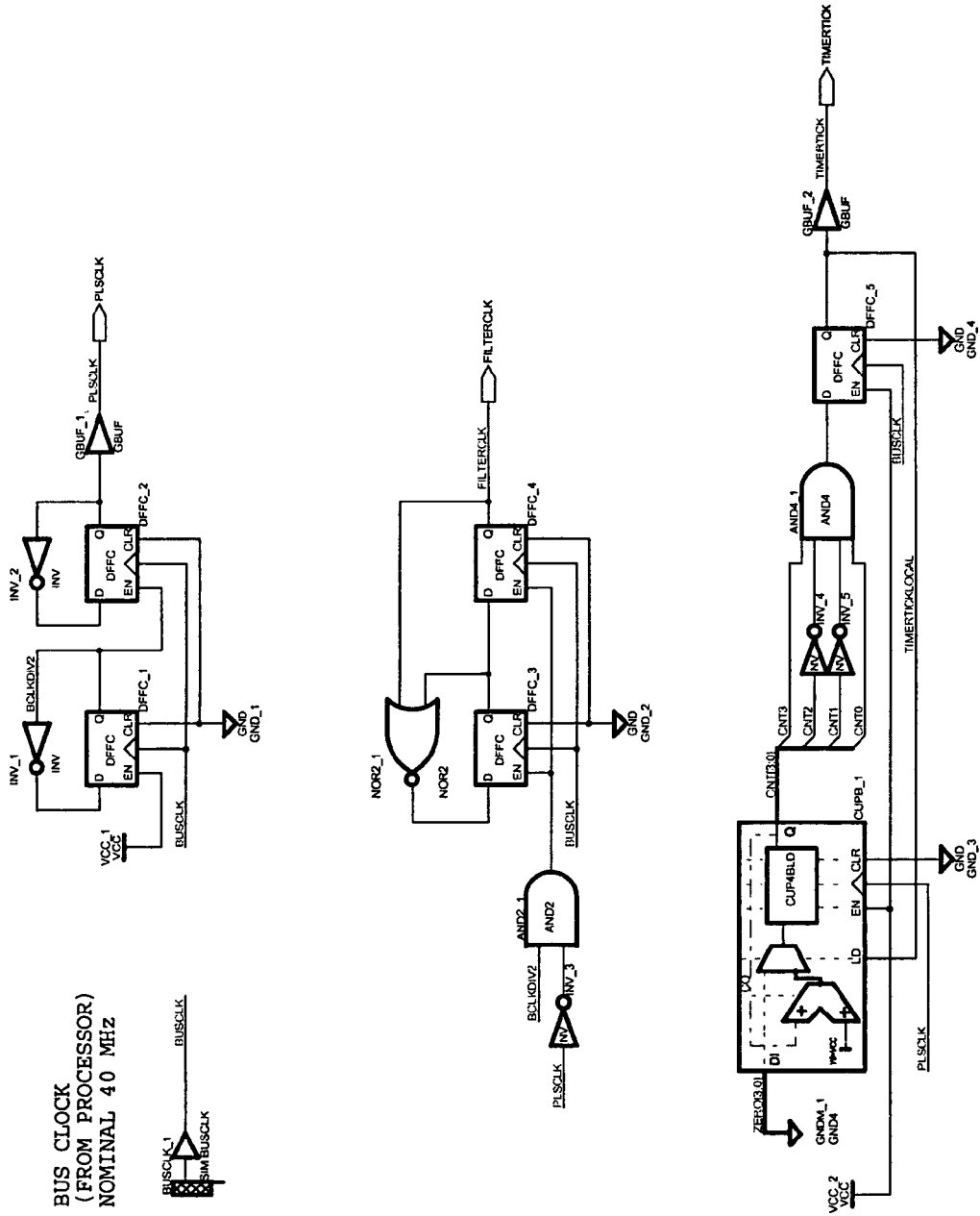
FIGURE 2 -- CLOCK GENERATOR

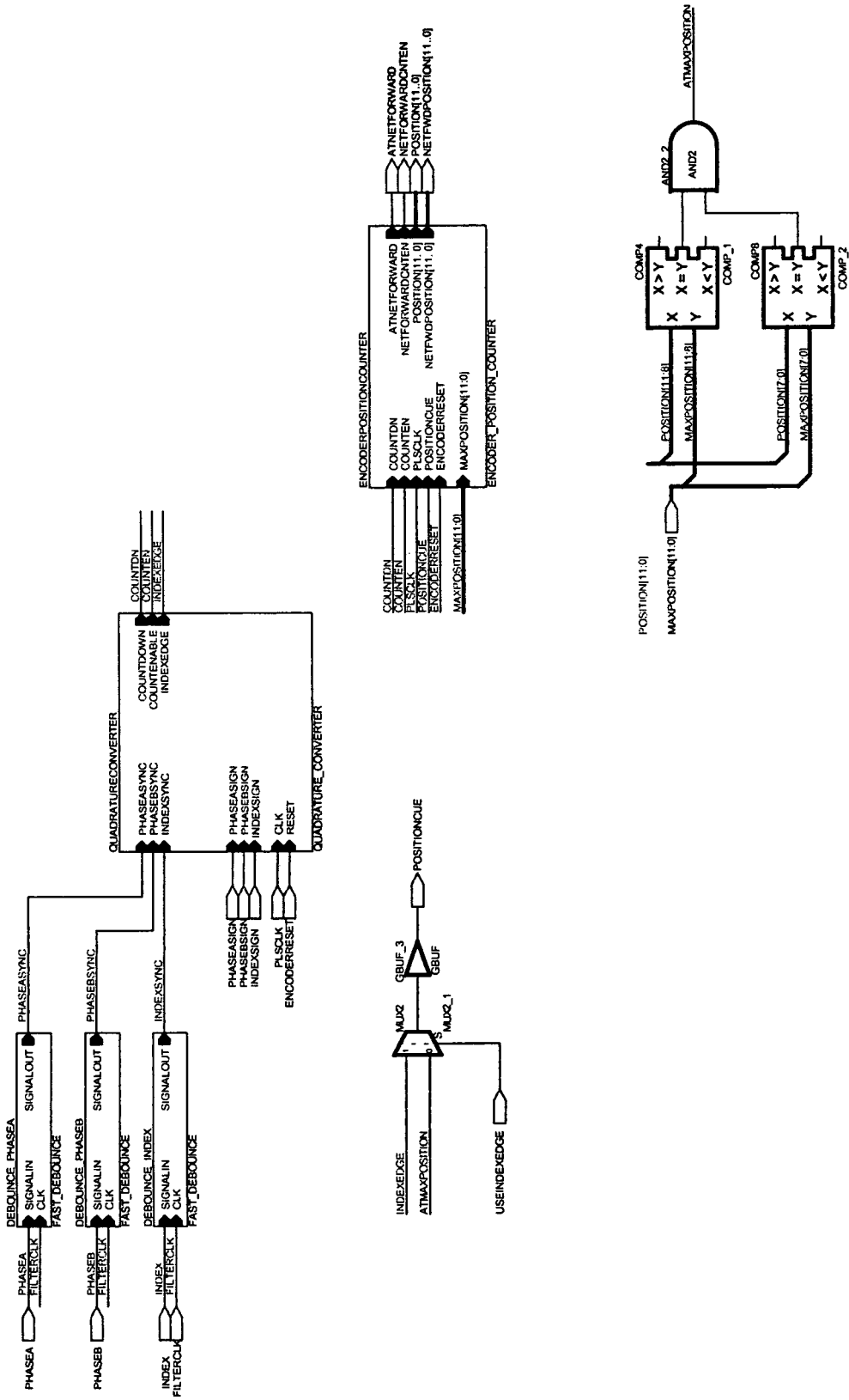
FIGURE 3 -- ENCODER POSITION GENERATOR

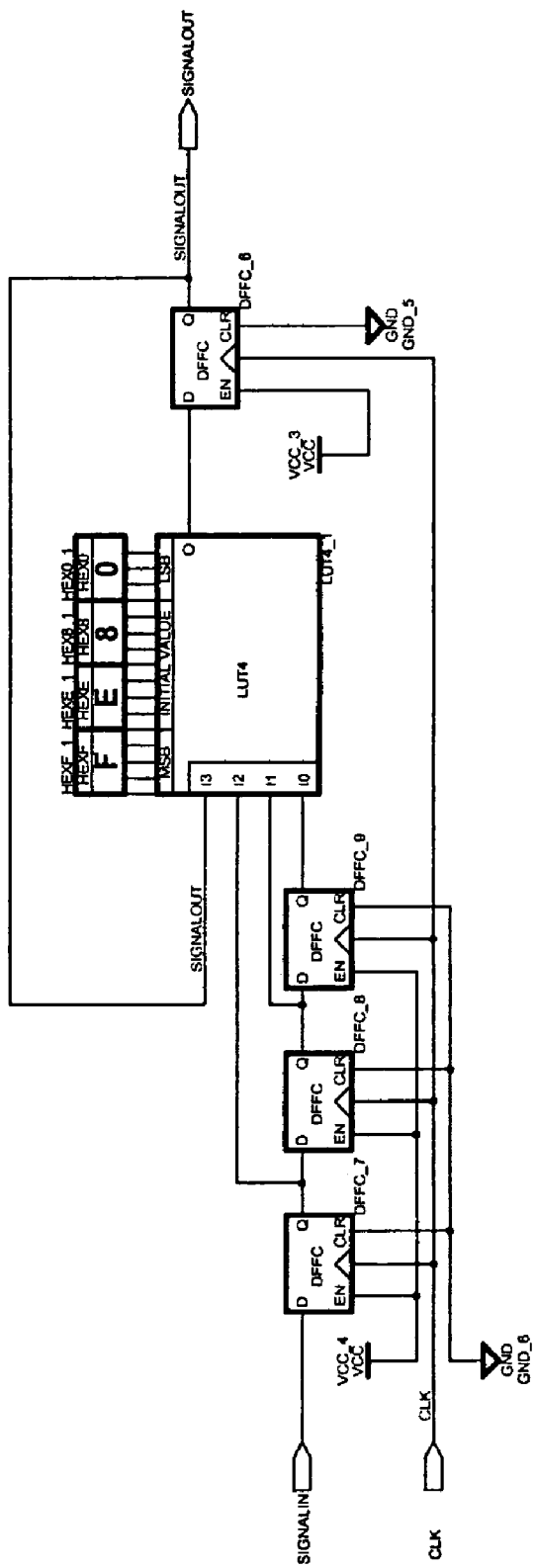
FIGURE 4 -- FAST SIGNAL DEBOUCE

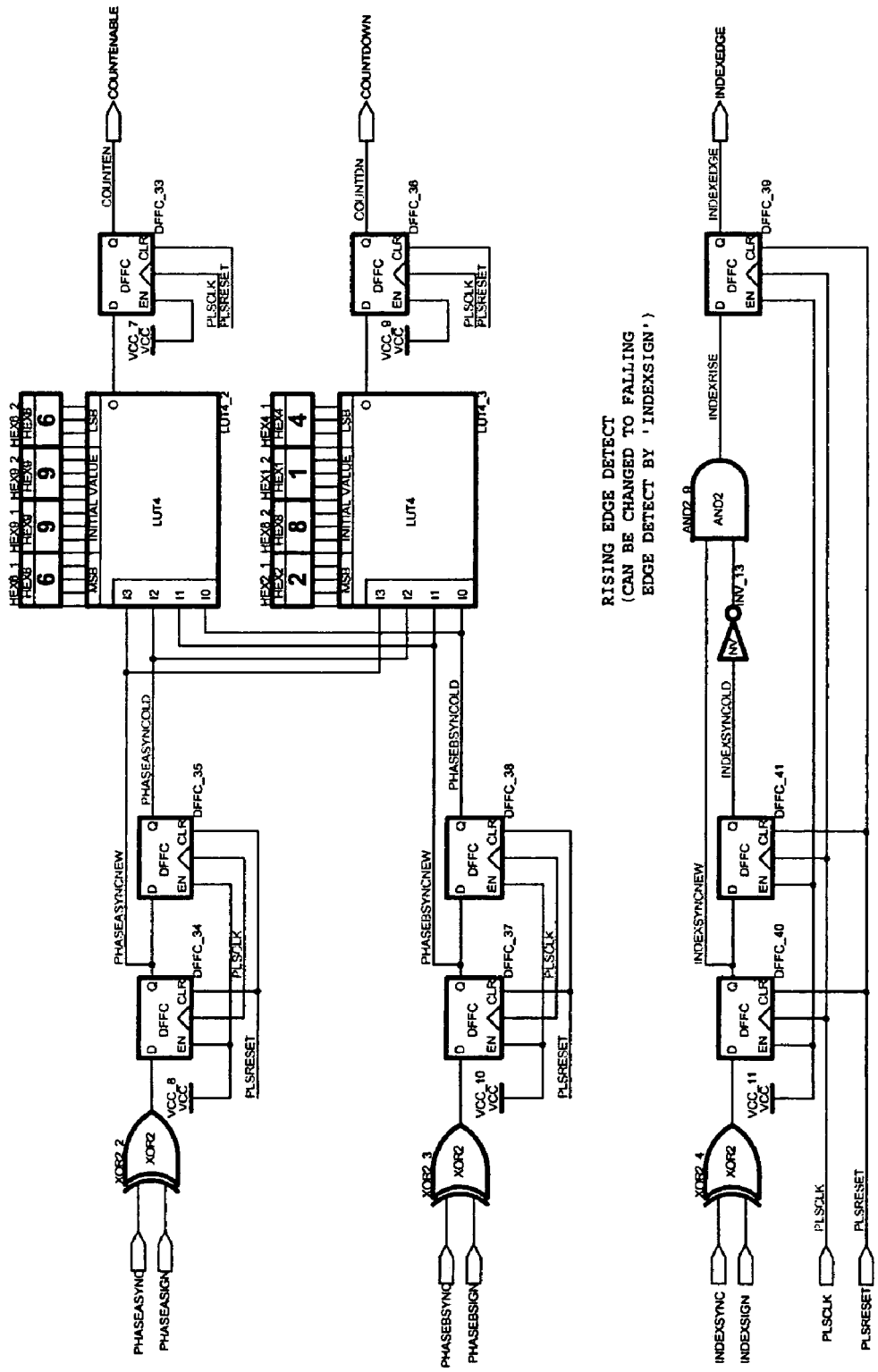
FIGURE 5 -- QUADRATURE CONVERTER

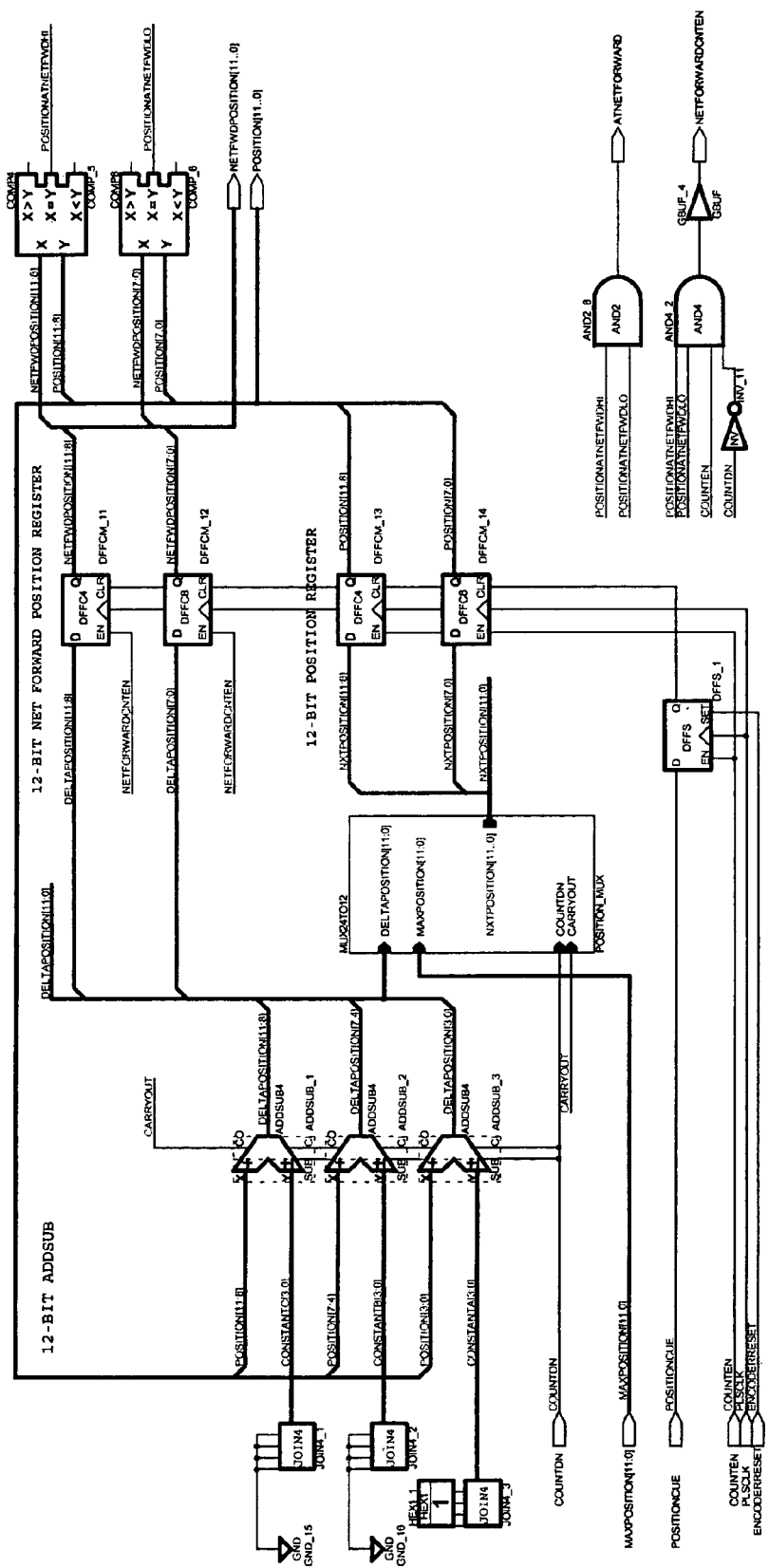

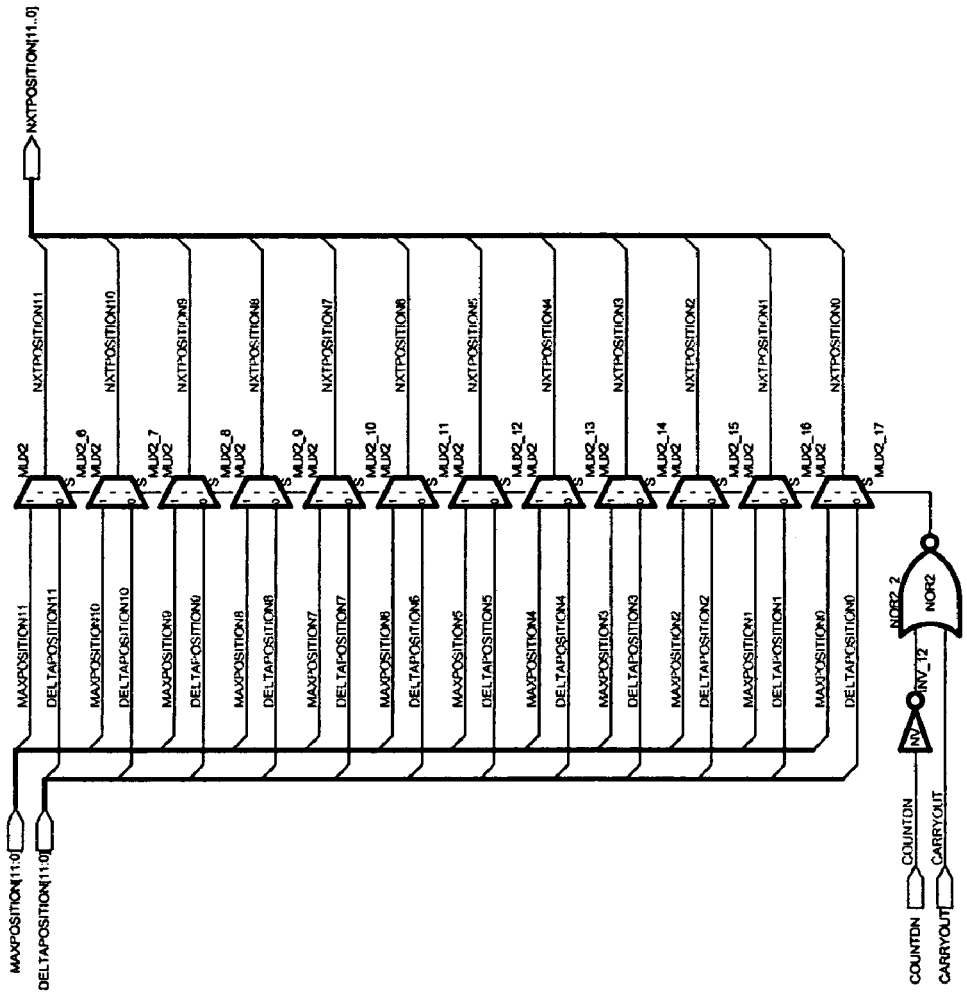
FIGURE 7 -- POSITION MULTIPLEXOR

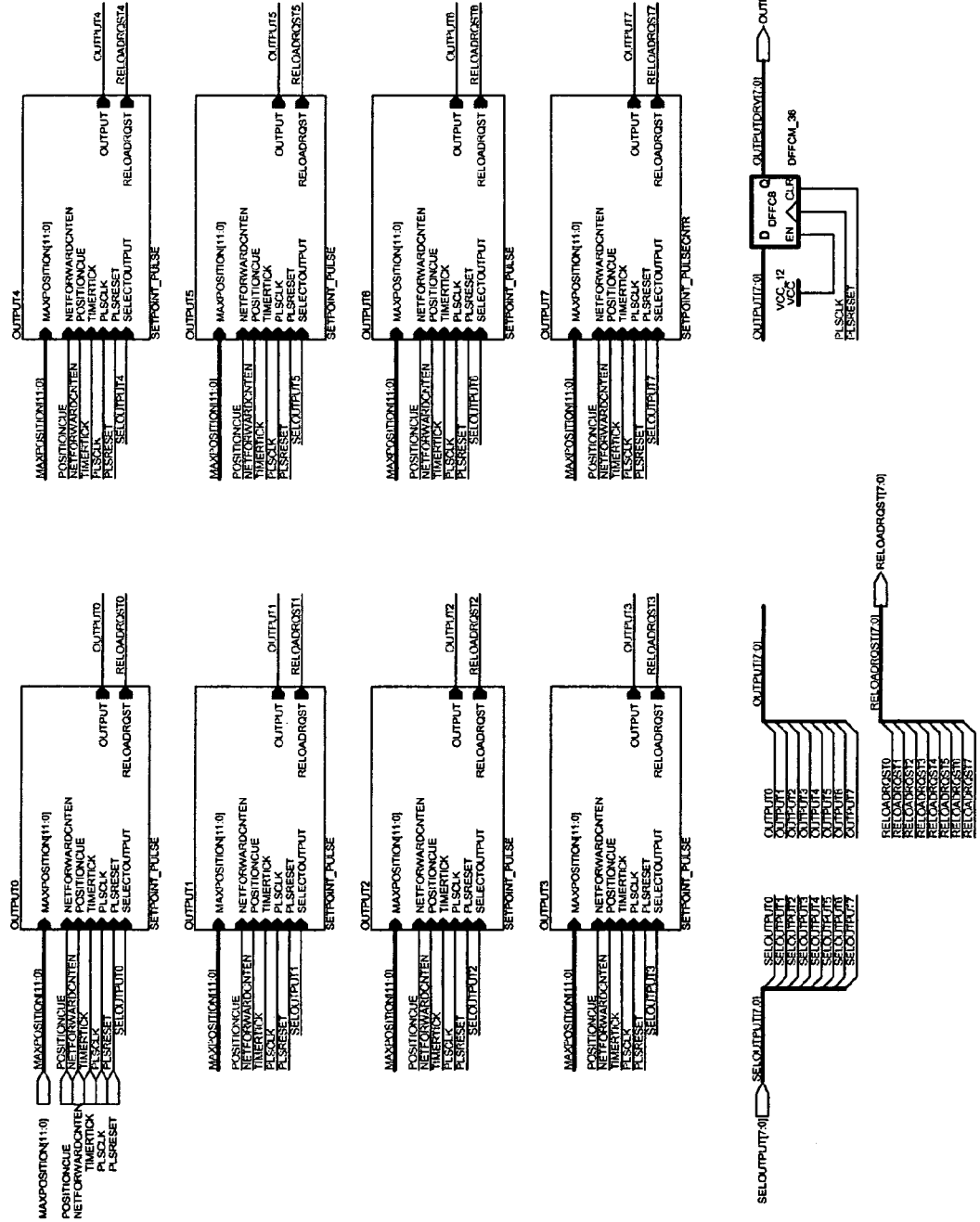
FIGURE 8 -- OUTPUT GENERATOR

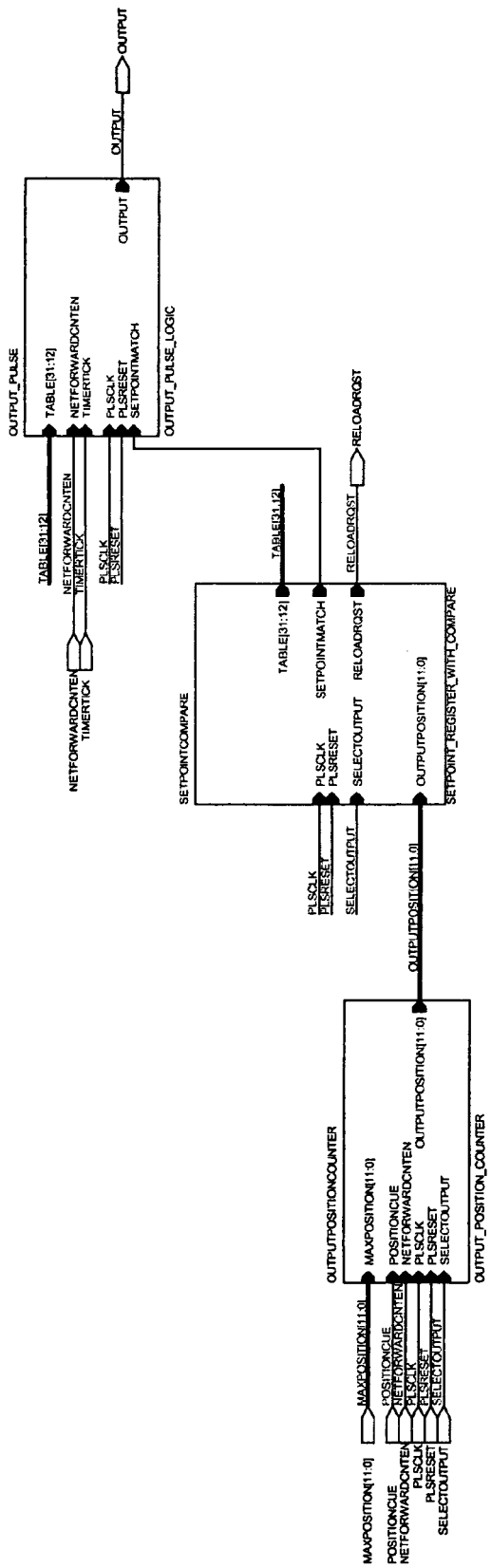
FIGURE 9 -- SETPOINT PULSE MODULE

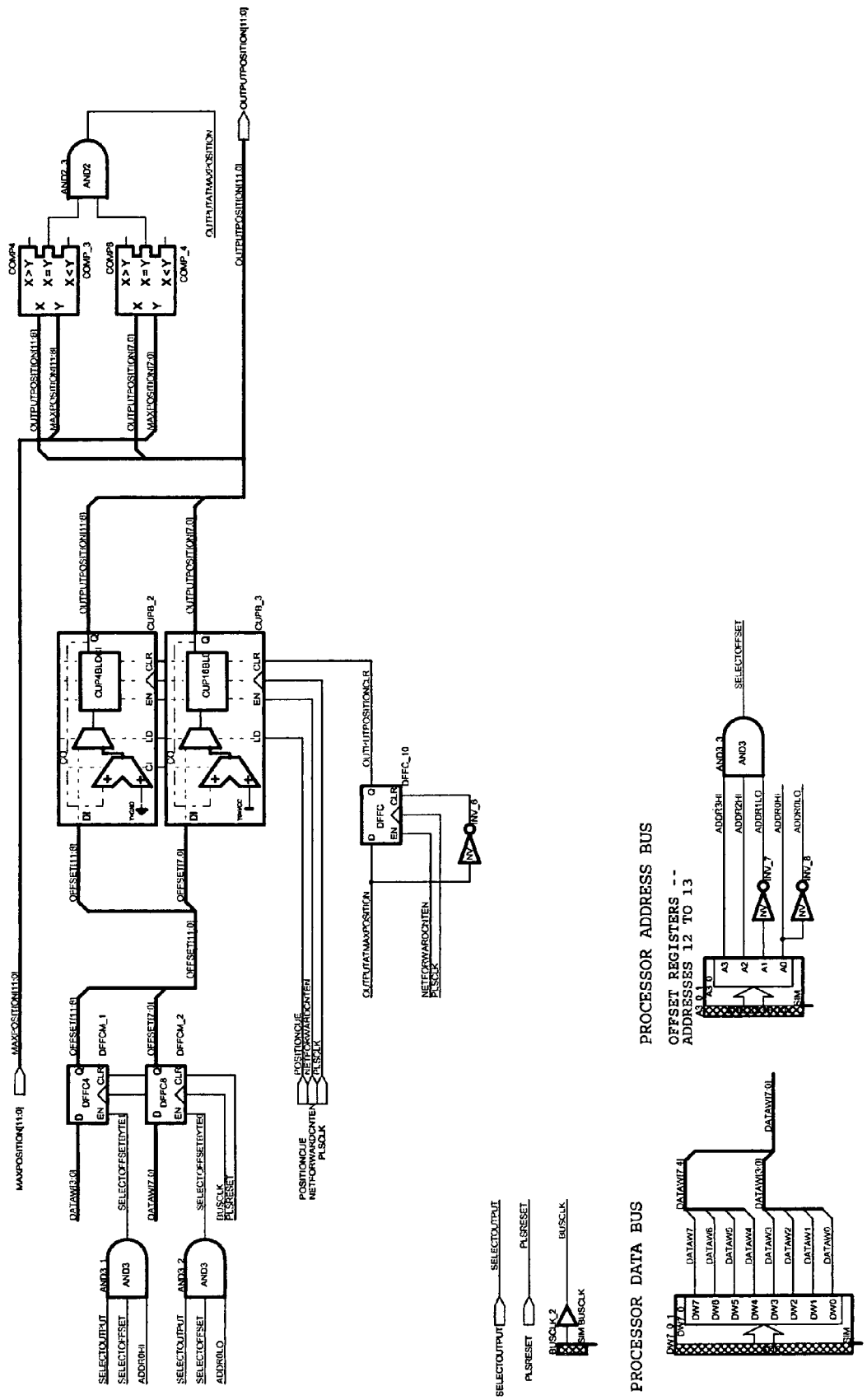

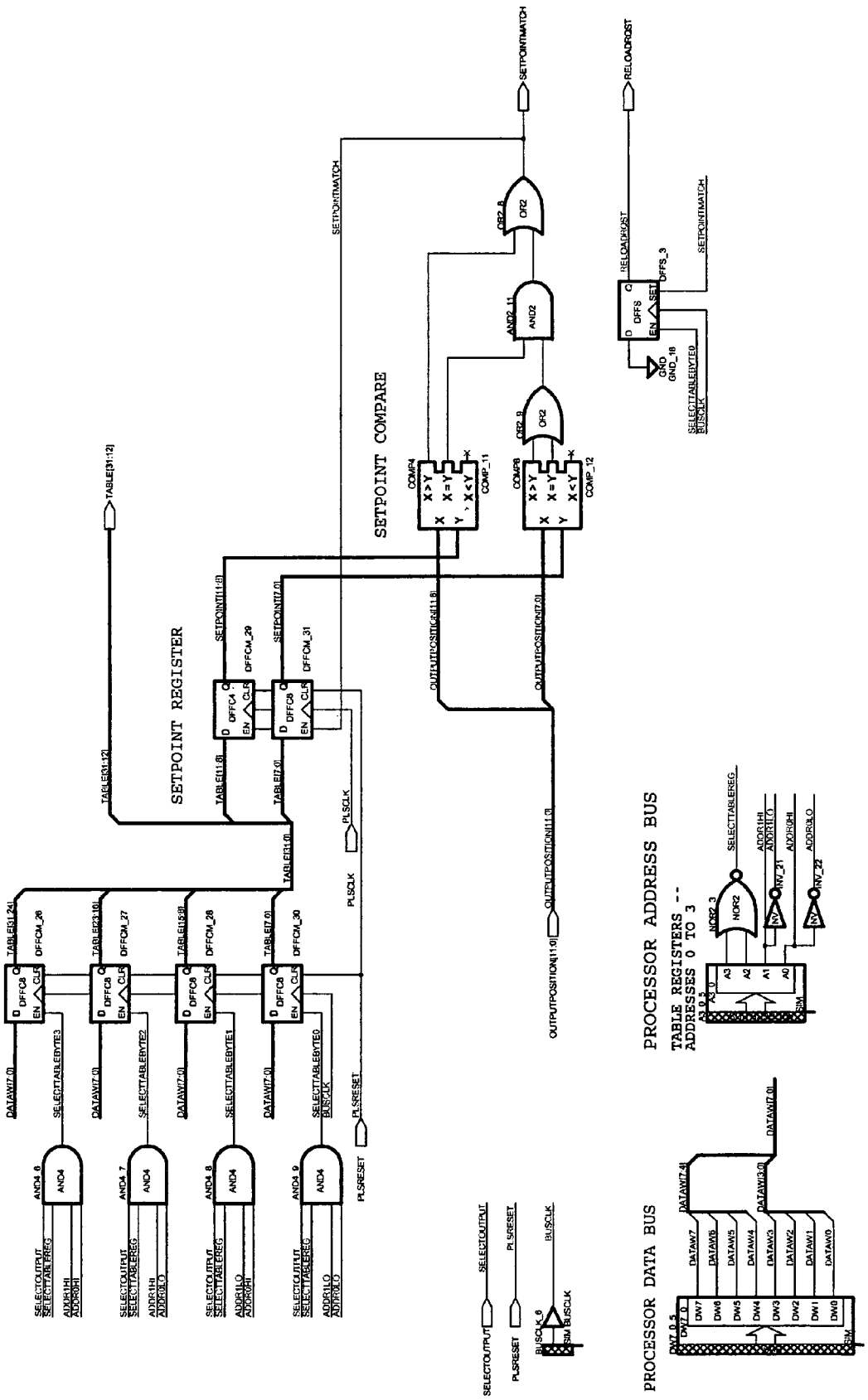
FIGURE 11 -- SETPOINT REGISTER WITH COMPARE

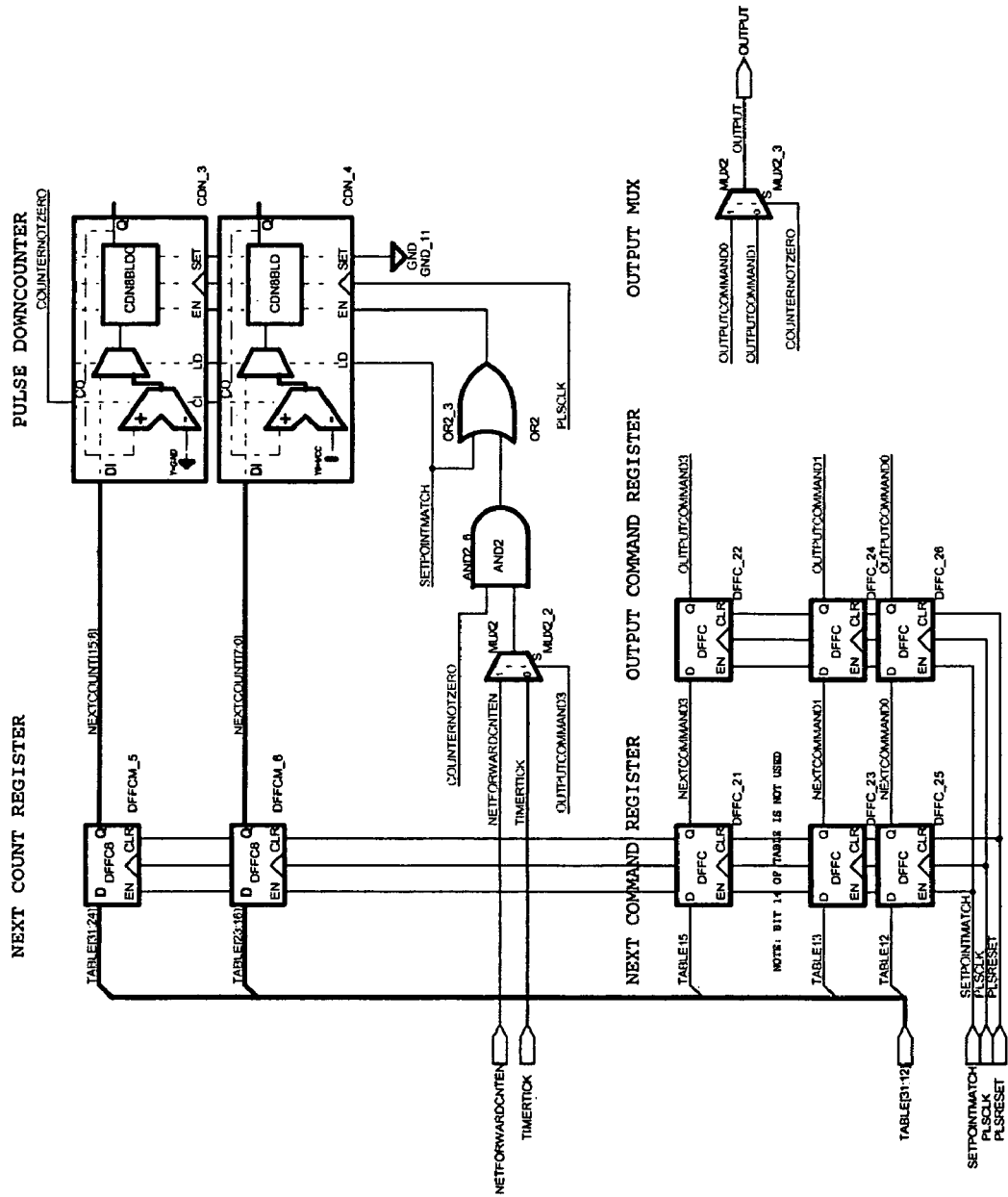
FIGURE 12 -- OUTPUT PULSE LOGIC

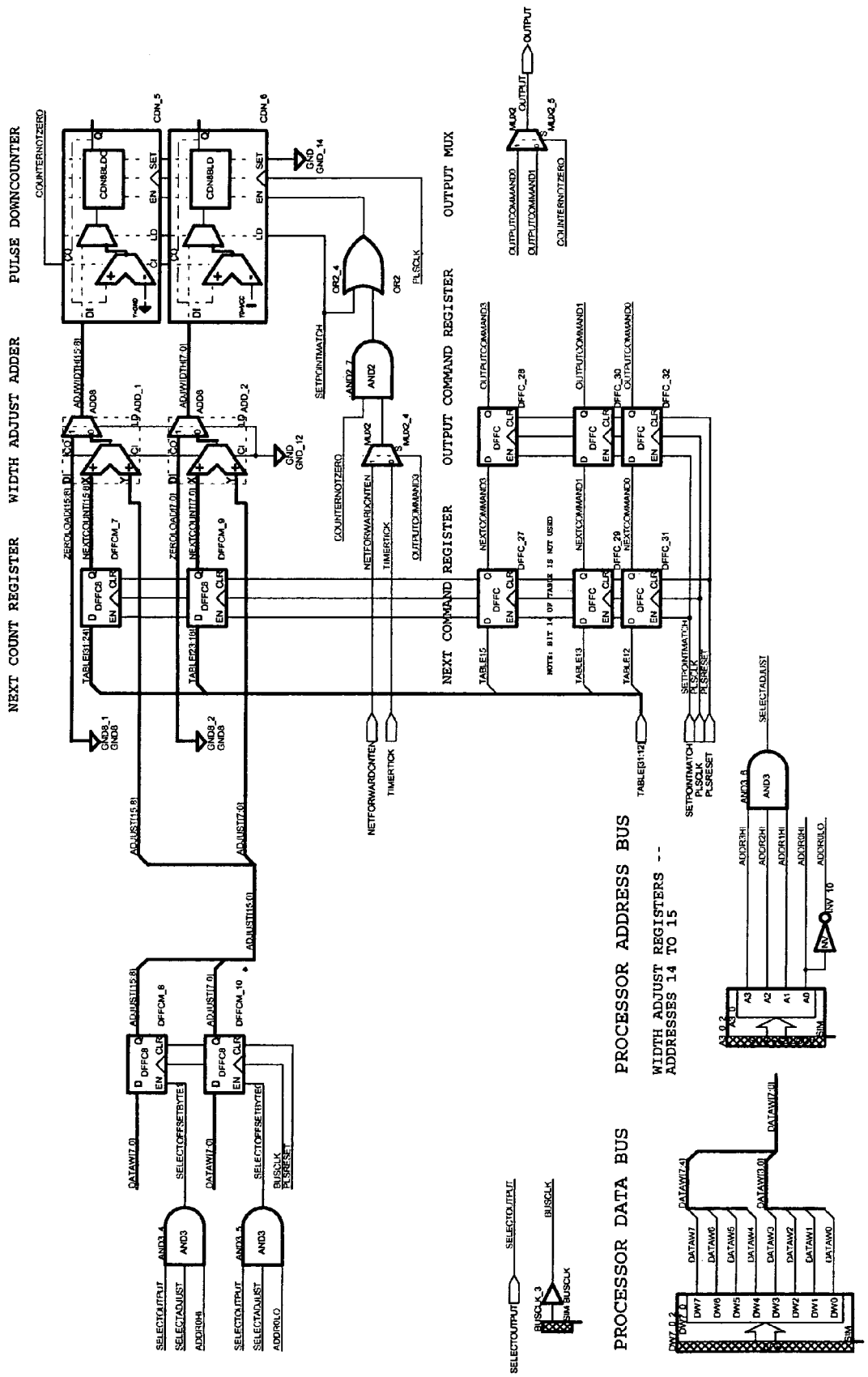
FIGURE 13 -- OUTPUT PULSE LOGIC WITH ADJUSTABLE WIDTH

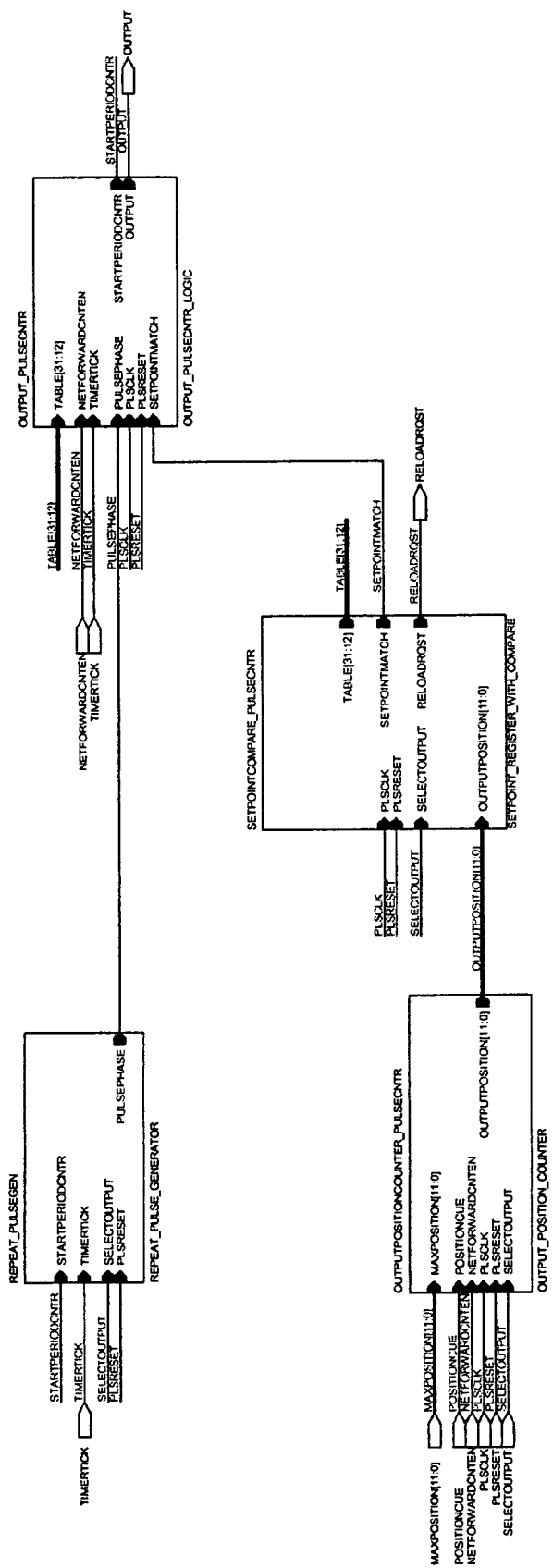
FIGURE 14 -- SETPOINT PULSE MODULE WITH OUTPUT PULSE COUNTER

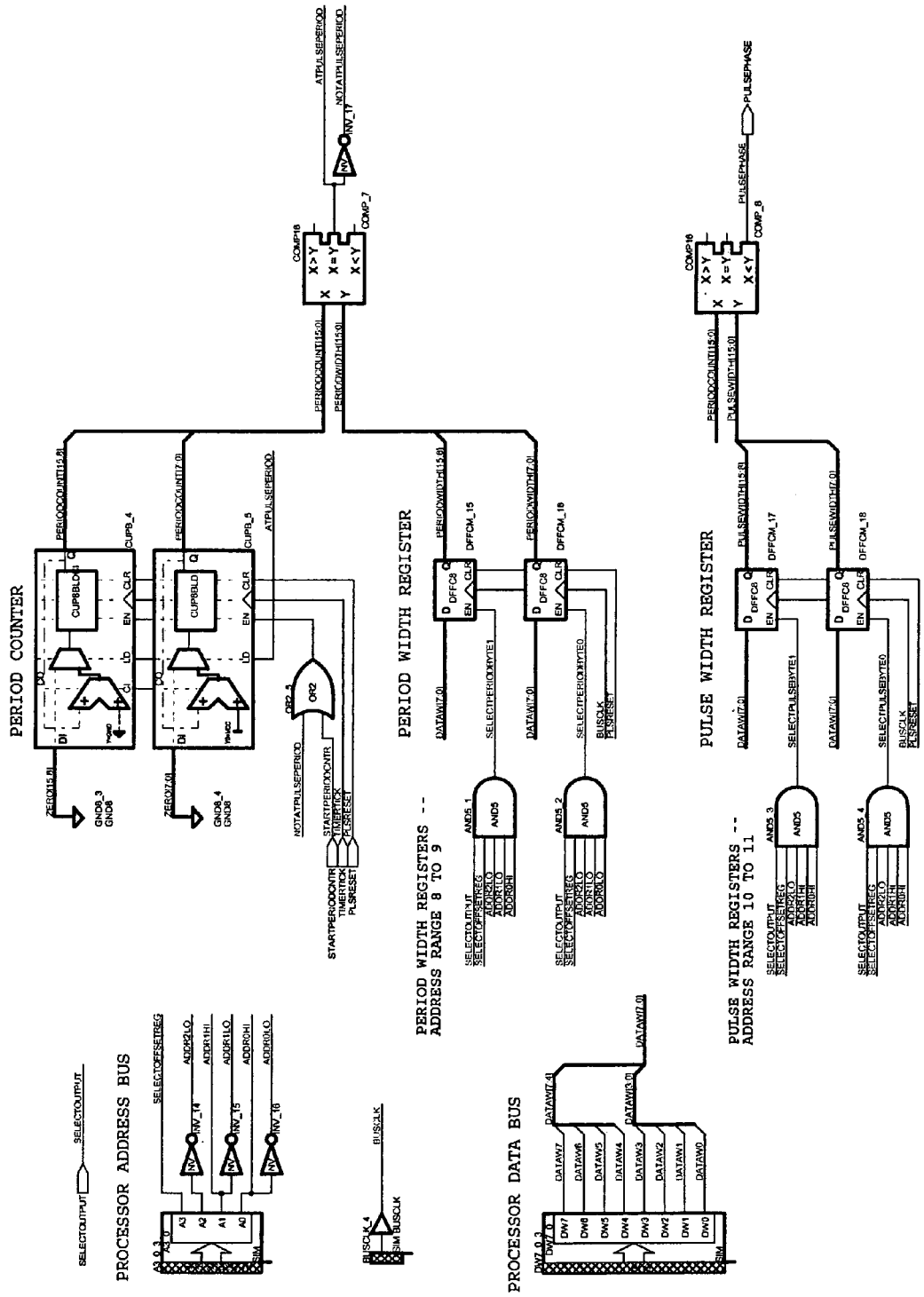
FIGURE 15 -- REPEAT PULSE GENERATOR

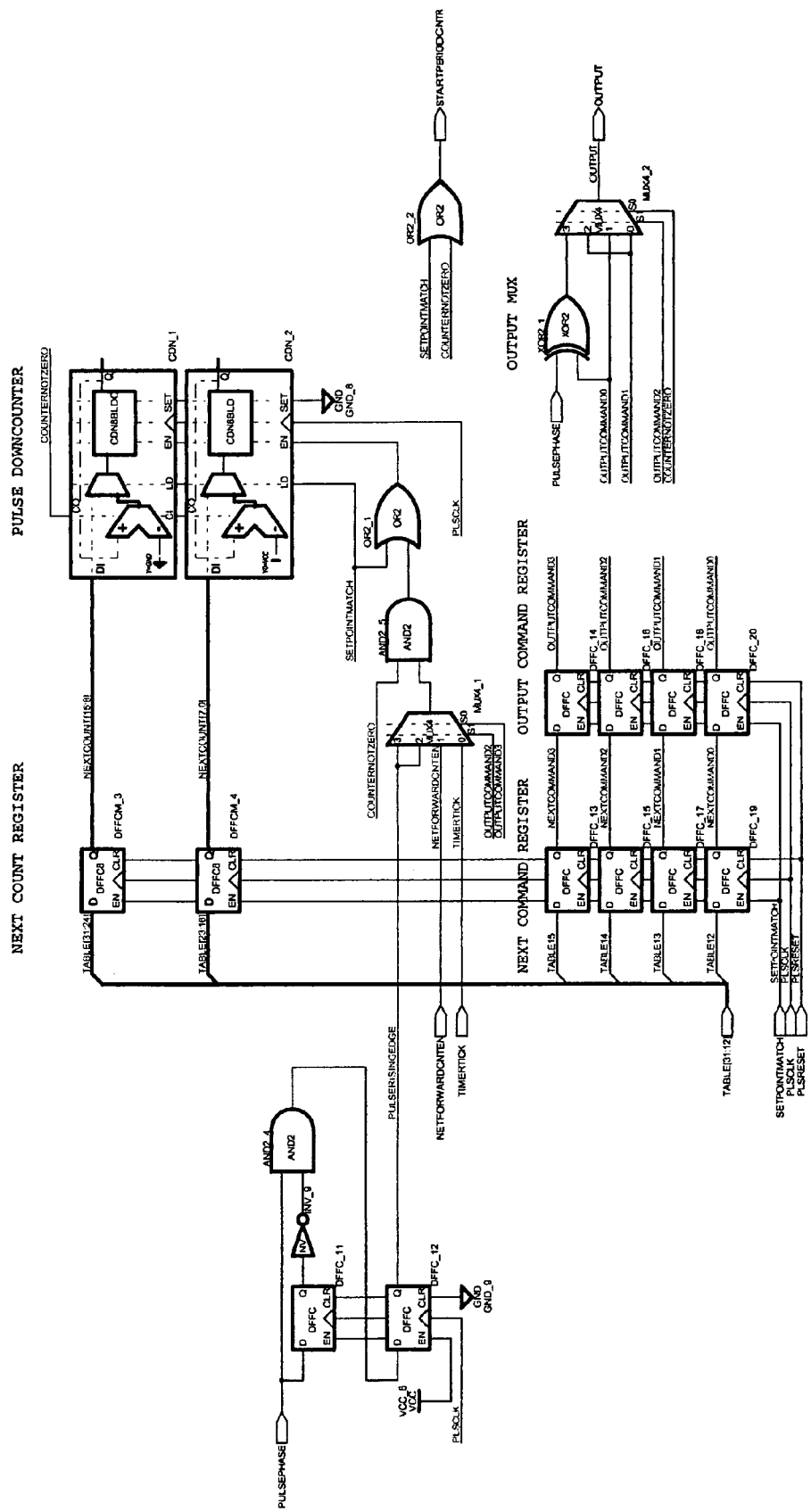
FIGURE 16 -- OUTPUT PULSE CNTR LOGIC

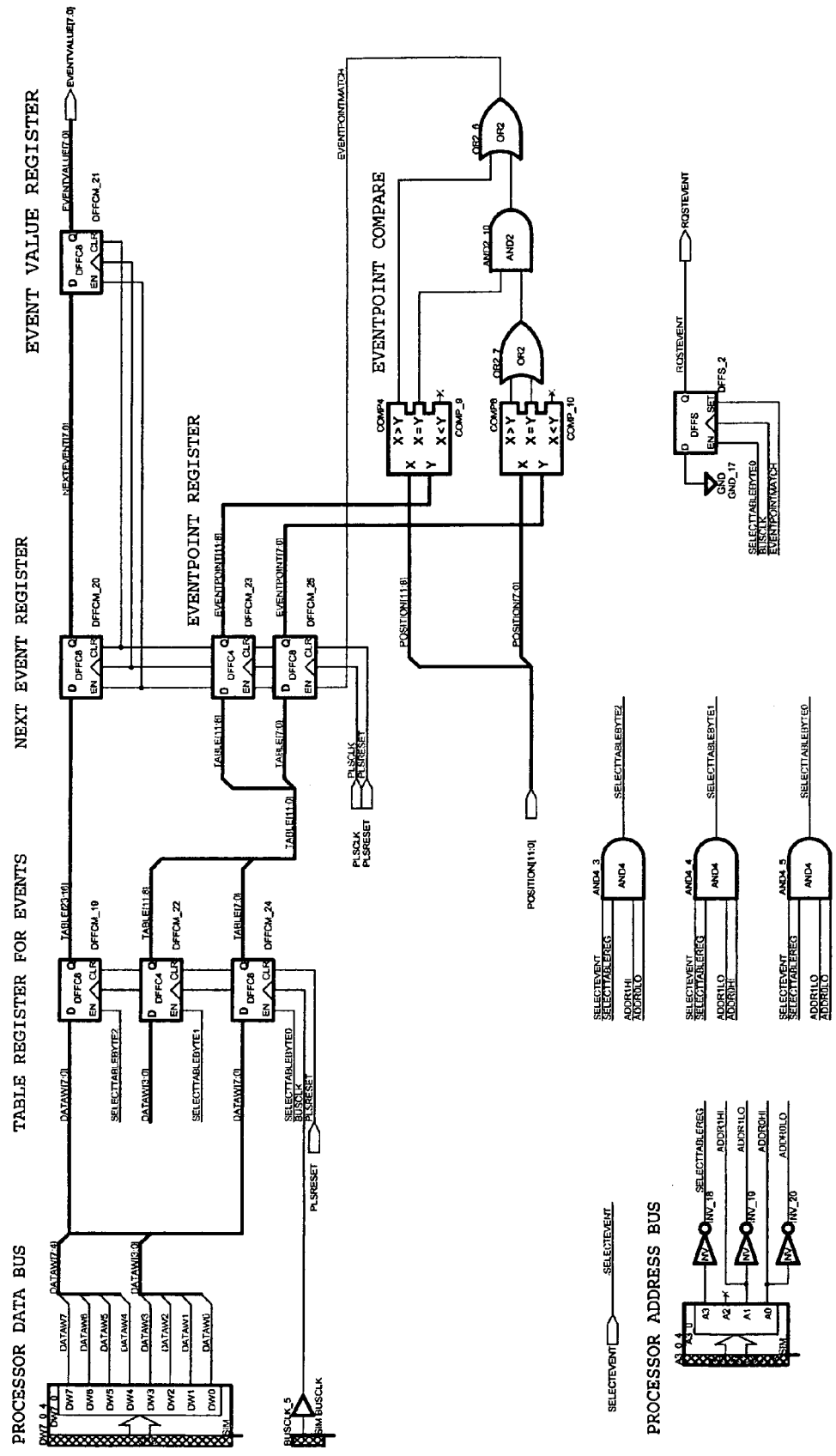
FIGURE 17 -- SET POINT EVENT

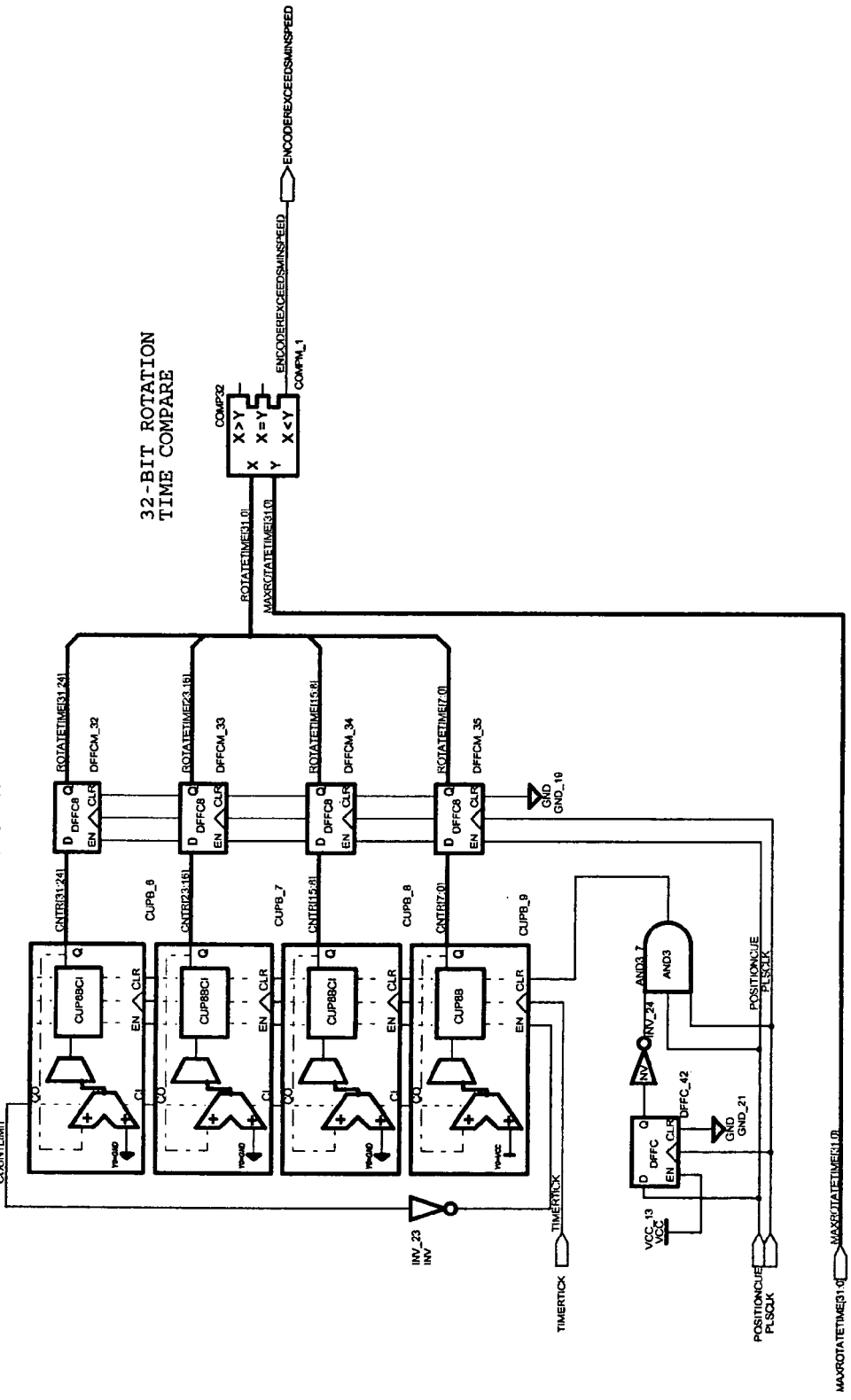

PROGRAMMABLE CONTROLLER FOR CONTROLLING AN OUTPUT STATE

CROSS REFERENCE TO RELATED APPLICATION

This application is a continuation in part of application Ser. No. 60/398,029, entitled "Methods for Electronically Generating Output Timing Pulses" filed on Jul. 23, 2002. Priority is claimed.

FIELD OF THE INVENTION

This invention relates to a Programmable Pulse Sequencer (PPS) that can implement both velocity-compensated and timed outputs at high speeds.

BACKGROUND OF THE INVENTION

The outputs of position transducers are commonly applied to control the ON/OFF state of external circuits. A system, created for this purpose, monitors the position of some mechanism (using the output of the transducer) and changes the ON/OFF state of one or more external circuits at one or more predefined positions or "setpoints". The sequence of ON/OFF changes produces a pattern of electrical signals that may be used to control electronic, pneumatic or other types of machinery or equipment.

A commonly used device in machine control is a Programmable Limit Switch (PLS). The PLS monitors the position of a system and changes the output state of one or more external circuits to either ON or OFF at one or more preset positions. Conceptually, the PLS operates on a table of preset positions and corresponding outputs changes, although the implementation of a particular PLS can vary greatly among devices.

It is well known that "adjustments" are sometimes desired to improve the performance achieved by the preset turn-on or turn-off of the outputs.

One example is "velocity compensation", where the value of the current velocity of the mechanism creates an offset from the setpoint at which the output state changes. Velocity compensation is needed to accommodate the constant delay in the mechanism from the changing of the output state to the desired mechanical reaction. If the velocity were constant, the setpoint could be changed by a fixed "offset" to accommodate the delay. In most systems, however, the velocity changes over time, faster and slower. This requires that an offset from the setpoint be periodically re-calculated.

A second additional system capability is timed outputs. This capability may specify that an output turns on after a specified amount of time following a setpoint. Alternatively, the timed output may specify that an output turn on at a given setpoint and then turn off after a specified amount of time. Yet another implementation of a timed output is a repeatable pulse output. The repeatable pulse output is triggered by a given setpoint as above, and then turns on for a set period of time and off for a set period of time. This on/off pattern either repeats for a fixed number of counts or repeats indefinitely until it is disabled at another setpoint.

PLS systems are commonly implemented in software. A part of the microprocessor-based system receives the output of the transducer and converts the signals to a position. Periodically, the microprocessor reads the position, compares it to one or more setpoints and, when appropriate, changes the state of one or more of the external circuits from OFF to ON or from ON to OFF. Even if there is some hardware support, the timing "adjustments" often are implemented in software executing on a microprocessor. To apply velocity compensation, the software determines the rate of change in position, determines the current offset of position needed to accommodate the fixed delay, and adds the calculated offset to the current position when comparing to the setpoints. Timed outputs can be similarly programmed.

A requirement to receive a fast rate of change in position, or a requirement for low latency in changing the ON/OFF state of the circuits, may be beyond the capabilities of software executing on even a fast microprocessor. In this case, the system may be implemented with a combination of specialized circuits to operate jointly with a microprocessor to perform the required function. Such a system is described by Klaes, et al. in U.S. Pat. No. 5,227,965. The invention described by Klaes implements a PLS system with velocity compensation, but it is not able to provide timed outputs. In addition, the Klaes invention has a flaw that inhibits its use in some applications.

SUMMARY OF THE INVENTION

This invention involves the following improvements to the art:

a) The use of second position register, a comparator and some logic integrated into the up/down position counter to produce a "Net Forward" position, and "AtNetForward" and "NetForwardCountEnable" signals.

b) The linking of hardware timers to the basic PLS system to generate outputs delayed by time from the setpoint or to generate one or more pulses triggered by the setpoint.

c) The linking of an event field to the basic system that can invoke a specific software event upon reaching a setpoint.

d) The use of additional position counters as an improved method over Klaes, et al. for generating velocity compensation.

e) The use of a hardware timer and fast compare logic to disable outputs when the rotational speed is not valid for system operation.

Although PLS systems operate usually in only one direction, sometimes the motion reverses temporarily due to an automation line that starts and stops or during a line shutdown or during a re-alignment. In these cases, it may be important to activate certain outputs only if the movement is "net forward", i.e. the total forward movement is greater than the total reverse movement. It is very important to have a very accurate method of determining net forward motion. The invention discloses a method of building an up/down counter with a built-in net forward motion position register and detector. The signal "AtNetForward" can be used to activate outputs only when the current position is at the Net Forward Position. The "NetForwardCountEnable" signal is useful when using multiple position counters in a PLS. Only the main counter must record up/down position changes; all the other counters can be net forward counters since only the net forward position is needed to compare with the setpoint.

An aspect of the invention is to include a means for triggering a timer or multiple timers for each output in a basic PLS system. This allows more accurate control of hardware systems. It also allows changing outputs based on time. The basic PLS system can turn an output on at a setpoint and turn an output off at a setpoint.

Adding a single timer connected to the output according to the invention adds four new operations:

1) turn an output on at a setpoint after a time delay,
2) turn an output off at a setpoint after a time delay,
3) turn an output on immediately at a setpoint and then turn it off after a time delay, and
4) turn an output off immediately at a setpoint and then turn it on after a time delay.

When two timers are added to a single output according to the invention, two additional operations are created:
1) after reaching a setpoint, delay a period of time and turn the output on, then delay a period of time and turn the output off and
2) after reaching a setpoint, delay a period of time and turn the output off, then delay a period of time and turn the output on.

Finally, when two timers and a counter are added to the output of a basic PLS system according to the invention, the output can be programmed to start at a setpoint and produce a series of pulses with a defined on and off time. This series can continue until it is explicitly disabled at a setpoint or until a specific number of pulses have been output.

It should be appreciated that no matter how sophisticated the basic PLS system becomes, the function is limited to simple logic. The PLS can only produce a sequence of outputs based on information to change the outputs at specific setpoints. Commercially, some PLS systems have been expanded to react to a second set of inputs that can enable or disable a group of outputs. But the very nature of the system limits this functionality to simple Boolean logic. To handle particularly unusual operations based on position and other factors requires the intervention of a programmable compute engine. Most PLS systems have a programmable processor; the difficulty is accurately triggering the processor to perform a specified function at a specified point. Thus, another improvement to the art according to the invention is to add a field to the data driving the PLS such that upon reaching a setpoint, a specific event can be triggered on a programmable computing engine (most likely a microprocessor). This event executes in the programmable computing engine concurrently with the change in outputs.

The invention described by Klaes, et al. implements velocity compensation (i.e. changing the position at which an output turns on or off based on a function of the current rate of change in the position) by using a hardware adder to add the position offset to the current position. One limitation of the Klaes technique is the requirement that the position of the system has an upper position count limit of $2^N-1$. (Otherwise, the adders will not properly wrap-around when the upper limit is reached.) Unfortunately, many implementations use encoders that wrap at multiples of 1000 (e.g., 1000, 2000, 4000, etc.); the simple adder of the Klaes system would not properly function with these encoders.

A more simplified and versatile solution according to the invention is to implement velocity compensation by using a separate position counter for each output. The independent position counter operates in parallel with the master position counter except that when the master position counter rolls-over to zero, the independent position counter is loaded with a value that is equal to the amount of the velocity compensation. With the independent position counter containing the offset from the master position counter, the standard method of checking setpoints can be applied.

In some systems, it is important that operations do not take place until the machine reaches a minimum operating speed. Current systems measure the rotational speed either in software or in hardware and then make the enable/disable decision in software. These methods are sufficient if the system is not moving fast or a long positional latency can be tolerated. If, however, the operation requires precision enables and disables, a more accurate solution is required. The invention implements the minimum-velocity enable using both a precision (one microsecond) hardware counter and fast hardware compare logic. The preferred implementation can perform the speed comparison and set the enable/disable signal in less than one change in transducer position. Further, because of the fast comparison, the change in enable/disable can be made synchronously to the rotational position.

This invention may be accomplished in a Programmable Pulse Sequencer (PPS) and method. The invention can implement both velocity compensation and timed outputs at high speeds. The system is based on using multiple counters with limit registers and hardware setpoint comparators in combination with a microprocessor. This differs from Klaes, which implements the velocity compensation with an adder. Further, the invention accomplishes the implementation of a hardware comparator to accurately trigger a software event. Finally, the invention comprises the use of additional hardware counters that are added to the implementation to create one or more outputs that can generate a repeatable pulse.

The inventive PPS monitors the position of a system. Based on one or more preset positions, the PPS can directly change the output state for a specified number of positions or a specified amount of time. In addition, based on more or more preset positions, the PPS can cause an event that invokes a software procedure selected by the event. The software can execute a more complicated algorithm than can be expressed by the simple preset pulse specifications. The result of this algorithm may directly or indirectly turn-on or turn off one or more outputs.

This invention features a programmable controller for controlling an output state based on position indicated from a position transducer, comprising an interface to the position transducer that converts the transducer signals into a change in position, a transducer position counter that accumulates the change in transducer position, a net forward position counter that accumulates the net forward position, means for comparing the value of the net forward position counter and the value of the transducer position counter, means to update the position counter when the transducer signals indicate a change of position, and means to update the net forward position counter when the value of the net forward position counter and the value of the transducer position counter are equal and the transducer interface indicates a forward movement.

The programmable controller may further comprise means for disabling an output state when the transducer position does not match the net forward position. The transducer interface may further convert the transducer signals into an index signal that occurs once per cycle in a repetitive operation cycle. In this case, the programmable controller may further comprise means for setting the transducer position counter and the net forward position counter to zero when the index signal is detected and the transducer interface indicates a forward movement. The programmable controller may also further comprise means for setting a maximum position value, and comparison means for comparing the transducer position to the maximum position value. The programmable controller may still further comprise means for setting the transducer position counter to the maximum position value when the transducer position is zero and the transducer interface indicates a reverse movement.

The programmable controller may further comprise means for setting a maximum position value, and comparison means for comparing the transducer position to the maximum position value. In this case, the programmable controller may further comprise means for setting the transducer position counter and the net forward position counter to zero when the transducer position is equal to the maximum position value and the transducer interface indicates a forward movement. The programmable may still further comprise means for setting the transducer position counter to the maximum position value when the transducer position is zero and the transducer interface indicates a reverse movement.

Also featured in the invention is a programmable controller for controlling an output state based on position indicated from a position transducer, comprising an interface to the position transducer that converts the signals into a change in position, a storage means for storing the transducer position, a storage means for storing the net forward position, comparison means for comparing the stored value of the net forward position and the stored value of the transducer position, logic means for adding or subtracting the change in position to or from the transducer position, logic means to update the storage means of the transducer position with the result of the addition or subtraction, and logic means to update the storage means of the net forward position with the result of the addition when the stored value of the net forward position and the stored value of the transducer position are equal and the transducer interface indicates a forward movement.

In this embodiment, the transducer interface may further convert the transducer signals into an index signal that occurs once per cycle in a repetitive operation cycle. The programmable controller may further comprise means for setting the transducer position storage means and the net forward position storage means to zero when the index signal is detected and the transducer interface indicates a forward movement. The programmable controller may still further comprise means for setting the transducer position storage means to the maximum position value when the transducer position is zero and the transducer interface indicates a reverse movement. The programmable can also further comprise means for setting a maximum position value, and means for comparing the transducer position to the maximum position value. In this case, the programmable controller may further comprise means for setting the transducer position storage means and the net forward position storage means to zero when the transducer position is equal to the maximum position value and the transducer interface indicates a forward movement. The programmable controller may still further comprise means for setting the transducer position storage means to the maximum position value when the transducer position is zero and the transducer interface indicates a reverse movement.

Also featured in the invention is a programmable controller, comprising means for controlling an output state based on position indicated from a position transducer, and means for signaling the occurrence of an event based on position indicated from the position transducer. In this embodiment, the event signal may comprise an interrupt.

Further featured in the invention is a programmable controller having a programmable processor, the controller for controlling an output state based on position indicated from a position transducer, comprising an interface to the position transducer that converts the transducer signals into a change in position, means for accumulating the changes in position and storing the resulting transducer position, means for storing a selected position value, means for comparing the selected position value with the stored transducer position, and means, responsive to the means for comparing, for signaling the programmable processor when the selected position value is equal to the transducer position. This embodiment may further include means for storing a selected event value, and means for the programmable processor to read the selected event value, and means for reloading a new selected position value after the selected position value and the transducer value are equal and the programmable processor has been signaled.

In another embodiment the invention features a programmable controller for controlling an output state based on position indicated from a position transducer, comprising an interface to the position transducer that converts the transducer signals into a change in position, a counter that accumulates the change in transducer position, means to update the counter when the transducer signals indicate a change of position, means for storing a selected position value, means for comparing the selected position value with the stored transducer position, delay means to create a time delay, means for storing the value of the time delay, means to load the value of the time delay with a specified delay and begin the delay when the selected position value matches the transducer position, means for storing two output values, and means to output the first output value when the selected position matches the stored transducer position, and output the second output value when the time delay completes. In this embodiment, the programmable controller may further comprise a timer and an output value pair for each output of the controller.

In yet another embodiment, the invention features a programmable controller for controlling an output state during a repetitive cycle based on position indicated from a position transducer, comprising an interface to the position transducer, a master-position counter defining a maximum position value, one or more offset-position counters, means for indicating when the master-position counter has reached maximum position value, means for storing one offset value for each offset-position counter, means for loading the stored offset value of each offset-position counter when the master-position counter has reached its maximum value, means for indicating the next setpoint position to change the output, means for comparing the value in the master-position counter or one of the offset-position counters with the value of the setpoint position and indicating a match if the two values are equal, means for indicating a next-output value to be set when a match occurs, an output driver for producing an output state from the next output value when the match occurs, and means for selecting which position counter to compare with the value of the setpoint position.

Also featured in the invention is a programmable controller for controlling an output state during a repetitive operation cycle, comprising a hardware timer for measuring the period of the repetitive operation cycle, means for specifying a maximum cycle value, and compare logic for disabling the outputs when the measured period is greater than the maximum cycle value. The programmable controller may further comprise means for specifying a minimum cycle value, wherein the compare logic disables the outputs when the measured period is greater than the maximum cycle value or less than the minimum cycle value.

BRIEF DESCRIPTION OF THE DRAWINGS

Other objects, features and advantages will occur to those skilled in the art from the following description of the preferred embodiments of the invention and the accompanying drawings, in which:

FIG. 1 is a high level schematic diagram of a preferred embodiment of the design of the FPL for the programmable controller of the invention:

FIG. 2 is a more detailed schematic diagram of the clock generator of FIG. 1;

FIG. 3 is a more detailed schematic diagram of the encoder position generator of FIG. 1;

FIG. 4 is a more detailed block diagram of one of the digital debounce filters of FIG. 3;

FIG. 5 is a schematic diagram of an implementation of the quadrature converter of FIG. 3 using a look-up table;

FIG. 6 is a more detailed schematic diagram of the encoder position counter shown in FIG. 3;

FIG. 7 is a more detailed schematic diagram of a 12-way two-to-one multiplexer for the position counter of FIG. 6;

FIG. 8 is a more detailed block diagram of the output generator of FIG. 1;

FIG. 9 is a more detailed schematic diagram of one of the setpoint-pulse modules shown in FIG. 8;

FIG. 10 is a more detailed schematic diagram of an output position counter shown in FIG. 9;

FIG. 11 is a schematic diagram of a module for comparing the setpoint value to the output position shown in both FIG. 9 and FIG. 14;

FIG. 12 is a more detailed schematic diagram of the output pulse logic shown in FIG. 9;

FIG. 13 is an alternative implementation of the output pulse logic of FIG. 12;

FIG. 14 is a more detailed schematic diagram of the setpoint-pulse counter module shown in FIG. 8;

FIG. 15 is a schematic diagram of the repeat pulse generator in the setpoint-pulse counter module shown in FIG. 14;

FIG. 16 is a more detailed schematic diagram of the output pulse counter logic shown in FIG. 14;

FIG. 17 is a more detailed schematic diagram of the setpoint-event generator of FIG. 1; and FIG. 18 is a more detailed schematic diagram of the speed check module shown in FIG. 1.

DESCRIPTION OF THE PREFERRED EMBODIMENTS

One preferred embodiment of the invention describes a system comprising a microprocessor CPU and Field Programmable Logic (FPL). The system also contains multiple tables of values supplied by the user and stored in nonvolatile memory accessible by the microprocessor. Each table contains one or more entries; each entry contains a position value called a "setpoint" and data associated with that setpoint. The preferred system uses separate tables for each output. It is possible instead to combine the separate tables together and distinguish by output at a later juncture. Instead of specifying a position for ON and a position for OFF, an equivalent expression specifies the position for ON and the width of the pulse. These table entries contain the "setpoint", which is the position that begins or continues an output pulse, and a pulse width and command, which determine the shape and duration of the pulse. The command allows the duration of the pulse to be specified in either microseconds or encoder position counts. There also is an additional table of values for creating an event. The entries for this table specify the "setpoint" or position at which the event occurs, and the unique number for the event.

At initialization, the Field Programmable Logic is programmed to contain specific hardware to support the system. Then the CPU initializes the system by setting registers and loading the tables into memory. Finally, the CPU loads registers in the FPL to begin the hardware functions.

Included in the hardware functions of the FPL is a set of counters that generate the clocks and strobes needed by the hardware to run synchronously. All of these clocks and strobes are created by counting down from the main clock of the system generated by a crystal oscillator.

Pulses from a motion encoder are received and converted into a CountEnable and a CountDown signal. (The CountDown signal is so named because it is asserted when the encoder counts down and it is not asserted when the encoder counts up.) These signals are inputs into an up/down Encoder Position Counter that maintains the Encoder Position. The Encoder Position Counter increments when the CountEnable signal is asserted and the CountDown signal is not asserted; it decrements when both the CountEnable and the CountDown signals are asserted. The Encoder Position Counter can be reset to zero either by reaching a Maximum Position value or by either the rising or falling edge of the Index signal from the encoder. The Encoder Position Counter also maintains a Net Forward Position value that tracks the net forward position of the up and down movements of the encoder. A Net Forward Count Enable signal is asserted when the Encoder Position Counter equals the Net Forward Position value and the Count Enable and Count Down signals decode as count up on the next clock.

The preferred embodiment has a separate module for each output. Each module has its own Output Position Counter that counts up when enabled by the Net Forward Count Enable signal. Each Output Position Counter has its own check of Maximum Position value to wrap-to-zero appropriately. In addition, the counter can be loaded with an "Offset" value simultaneous with the Encoder Counter reaching zero thus allowing the Output Position Counter to have a specified offset from the Encoder Position Counter. The module for each output also contains registers for holding the next entry from the table. As noted above, this table entry contains the next "setpoint" and a pulse width and command to determine the next output bit from this module. The command part of the table entry specifies, in part, whether the pulse width is measured in microseconds or in position counts. When the output position reaches a "setpoint" (determined by a hardware comparison with the Output Position Counter), a Pulse Width value loads into a down counter and a value loads into the Command register specifying how to create the output. Reaching a setpoint also loads the next table entry from the table registers and triggers a signal that requests that the CPU re-load the table registers.

The eighth output module has additional hardware to interface to a counter and registers for generating multiple pulses of specified width and period. Instead of executing a pulse beginning at a setpoint and having a pulse width, the eighth output module optionally can begin generating a fixed number of pulses. The width and period of this pulse is not set by the table entry. Instead the Pulse Width and Pulse Period registers set the width and period of the pulse in microseconds. The number of pulses to be generated is specified in the table entry. Pulse generation also can be stopped by another entry of the table at a given setpoint.

The preferred embodiment also contains a module for generating an event. The Event module contains registers for holding the next "event" entry from the table and logic to compare the event setpoint with the current position. When the position reaches the setpoint, the Event is triggered and an interrupt signals the CPU. Reaching a setpoint also loads the next table entry from the table registers and triggers a signal that requests that the CPU re-load the event table registers.

The preferred embodiment also contains a module for measuring the speed of the encoder. This module can enable or disable some or all of the outputs depending on whether the speed is within a valid range.

The preferred embodiment of the invention uses a microprocessor CPU and field programmable logic (FPL) on the same device (a CPU/FPL device). Altera, Triscend Semiconductor and Xilinx are known manufacturers of devices of this type. This invention can also be implemented with a microprocessor and a separately packaged programmable logic device, although some extra effort will be required to interface the two devices. The invention can also be implemented using a microprocessor and discrete hardware.

In addition to the CPU/FPL device, the system requires non-volatile memory for storing the code, configuration information, and permanent data. The system also needs volatile memory for storing temporary values and data that changes during operation. In the preferred embodiment, the non-volatile memory is a flash-type device external to the CPU/FPL; it contains the program code for the microprocessor, the configuration code for the programmable logic, and the operation tables and data. The volatile memory is an SRAM-Type device and may be internal or external (or some of both) to the CPU/FPL. Other types of memory devices could be used for storing code and data for this invention, but are considered less desirable for the preferred embodiment.

The system also includes miscellaneous electrical components. A crystal connects directly to the microprocessor to support generating a microprocessor clock. The preferred embodiment also contains a set of differential receivers for interfacing to the motion sensor. The differential receivers accept differential signals from a motion encoder. These signals take the form of quadrature pulses that indicate a change in position and the direction of the change. The encoder typically also provides a differential "index" pulse that is active for one step every rotation of the encoder. There are electrical interface circuits for several general-purpose inputs, and output circuits for electrically driving the output signals of the system. A communications interface allows an external computer to connect to the microprocessor; appropriate communications software executing on the microprocessor allows the external computer to set and monitor values and download configuration data. These electrical components and the memory devices described above are known to those skilled in designs with microprocessors.

The heart of the invention is implemented in the programmable logic section of the CPU/FPL. In the preferred embodiment, the design of the FPL is divided into five major sections—the Clock Generator, the Encoder Position Generator, the Output Generator, the SetPoint-Event Generator, and the Speed Check module. The interconnections between these five sections are shown in FIG. 1. The operations of these sections are described in detail below.

The CPU executes a program to support the hardware function implemented in the field programmable logic (FPL). During both initialization and operation, this support consists of copying entries one at a time from a "table" of information in data memory to byte-wide registers in the FPL. Each entry in the table consists of 32-bits of information (i.e. four bytes). In the preferred embodiment each output is associated with its own table and its own set of four byte-wide registers to receive table information from the CPU. In addition, the preferred embodiment contains a table-driven SetPoint-Event Generator that is associated with its own table. Each table entry for the SetPoint-Event Generator has three bytes; the SetPoint-Event Generator has a set of three byte-wide registers to receive table information from the CPU. At power-up the eight output tables and one event table are loaded into data memory from the non-volatile configuration memory or can be received through the communications interface. Then the CPU loads the first entry of each of the nine tables into the FPL. This completes the initialization. After initialization, the CPU waits for the requests from the FPL to transfer new table entries from data memory to the FPL. The table is organized in memory and accessed by the CPU using techniques well-known in standard practice.

The programmable pulse sequencer shown in FIG. 1 is supported with the following comments:

It is expected that the following signals are output from a control register in the FPL: PhaseAsign, PhaseBsign, Indexsign, UseindexEdge, EncoderReset, and PlsReset.

SelOutput [7:0] and SelectEvent come from the address interface of the processor. The interface is implementation dependent. MaxPosition comes from an external 12-bit MaxPosition register; MaxRotateTime comes from an external 32-bit MaxRotateTime register. Both of these registers are implemented in the FPL.

It is expected that the following signals are readable by the processor: Position [11:0], NetFwdPosition [11:0], AtNetForward, ReloadRqst [7:0], ReloadRqstEvent, and Event [7:0] using standard techniques that are dependent upon the implementation.

The Output Generator INTR1 output and the Setpoint Event INTR0 output connect to interrupt inputs of the CPU. OutputEnable connects to output driver logic.

The Clock Generator creates the major clocks and strobes. (See FIG. 2.) The programmable logic section of the CPU/FPL operates from the microprocessor clock. This clock is referred to here as BusClk. In the preferred embodiment, this clock has a frequency of 40 MHz. From this clock, logic in the FPL generates two other clocks and a synchronous strobe signal. PlsClk is a 50% duty cycle clock created by dividing BusClk by 4. FilterClk is P/sClk divided by 3; FilterClk is low for one period of P/sClk and high for the other two periods of PlsClk. FilterClk is P/sClk divided by 3 (synchronized so rising of FilterClk corresponds to rising edge of P/sClk). TimerTick is a one megahertz strobe that is high for one PlsClk every microsecond; it is generated by dividing PlsClk by 10. TimerTick is result of counting PlsClk cycles up from 0 and reloading on 9. The implementation of these clocks is not described any further as they are easily created by those skilled in hardware design.

The Encoder Position Generator receives PhaseA, PhaseB and Index quadrature signals from the external differential input receivers that are connected to the motion sensor and creates the Position value for the system (FIG. 3). Inside the Encoder Position Generator are three digital "debounce" filters; an implementation of one is shown in FIG. 4. These filters remove "glitches" from the encoder signals; by implementation, glitches are pulse widths that have shorter duration than three periods of FilterClk. If Output is '0', it will change to '1' only if next 3 samples are '1'. If Output is '1', it will change to '0' only if next 3 samples are '0'. The filter implementation shown uses a look-up table, but the function may be implemented using digital logic by those skilled in the art.

The outputs of the debounce filters are called PhaseASync, PhaseBSync and IndexSync. The signals PhaseASync and PhaseBSync go into a logic block referred to as a Quadrature Converter; this block translates the quadrature phase signals into CountDown and CountEnable signals. An implementation of this Quadrature Converter using a look-up table is shown in FIG. 5. The table is shown below as Table 1. Other implementations are possible. The logic to change the quadrature signals to a count enable and count direction signal is well understood by practitioners of motion engineering.

TABLE 1

| State | A-new | A-old | B-new | B-old | |
|---|---|---|---|---|---|
| Both Phase A and B low | 0 | 0 | 0 | 0 | Do nothing |
| Phase B falling, Phase A low | 0 | 0 | 0 | 1 | Count Up |
| Phase B rising, Phase A low | 0 | 0 | 1 | 0 | Count Down |
| Phase A low, Phase B high | 0 | 0 | 1 | 1 | Do Nothing |
| Phase A falling, Phase B low | 0 | 1 | 0 | 0 | Count Down |
| Phase A falling, Phase B falling | 0 | 1 | 0 | 1 | Illegal |
| Phase A falling, Phase B rising | 0 | 1 | 1 | 0 | Illegal |
| Phase A falling, Phase B high | 0 | 1 | 1 | 1 | Count Up |
| Phase A rising, Phase B low | 1 | 0 | 0 | 0 | Count Up |
| Phase A rising, Phase B falling | 1 | 0 | 0 | 1 | Illegal |
| Phase A rising, Phase B rising | 1 | 0 | 1 | 0 | Illegal |
| Phase A rising, Phase B high | 1 | 0 | 1 | 1 | Count Down |
| Phase A high, Phase B low | 1 | 1 | 0 | 0 | Do Nothing |
| Phase A high, Phase B falling | 1 | 1 | 0 | 1 | Count Down |
| Phase A high, Phase B rising | 1 | 1 | 1 | 0 | Count Up |
| Phase A high, Phase B high | 1 | 1 | 1 | 1 | Do Nothing |

Count up when phase A "leads" Phase B. Count down when Phase B "leads" Phase A.

IndexSync goes through a logic block that produces the IndexEdge signal; IndexEdge becomes high for one PlsClk period when the logic block detects a rising edge of Index-Sync.

The CountDown and CountEnable signals, along with PlsClk and several other signals, connect to a 12-bit Up/Down counter called the Encoder Position Counter, FIG. 3. The Encoder Position Counter has a very unique structure since it not only generates the 12-bit Position value, but it also generates a second 12-bit value called the NetFwdPosition (pronounced "Net Forward Position"). The Net Forward Position is simply the maximum position reached as the encoder detects forward and backward motion. If motion is constantly forward, the Position and the NetFwdPosition signals will be equal. However, if the encoder detects reverse motion, the Position signal will have a value that results from moving forward and reverse, but the NetFwdPosition signal will have the value of the most forward position.

The Encoder Position Counter (FIG. 6) is built from a 12-bit addition/subtraction unit that always either adds or subtracts one from the input, which adds when CountDn (Count Down) is low, and subtracts when CountDn is high. The Position signal is the first input to the addition/subtraction unit. The other input is a constant '1'. The addition/subtraction unit thus always produces a value one greater or one less than the current position. Up or Down is determined by the value of the CountDn signal, which connects to the Subtract and CarryIn inputs of the addition/subtraction unit. The signal output of the addition/subtraction unit is called DeltaPosition; it connects to one side of a 12-bit dual input multiplexer. The other half of the multiplexer connects to the 12-bit MaxPosition signal described below. The selection input of the multiplexer connects to the output of the logical combination of CountDn and the CarryOut signal of the addition/subtraction unit. When CountDn is low or the CarryOut is high, the multiplexer selects the output of the addition/subtraction unit, DeltaPosition. Only when both CountDn is high and CarryOut are low, does the multiplexer select the MaxPosition signal. This condition happens when the change in position is backwards (or reverse) and the counter is zero. Thus the multiplexer selects MaxPosition as the next position when the counting down from zero. (A more detailed implementation of the multiplexer is shown in FIG. 7.) The output of the multiplexer connects to the input of a 12-bit register, called the Position Register. P is Clk connects to the Clock input and the CountEn (Count Enable) signal connects to the Enable input of the Position Register. (The Position Register also has an asynchronous reset input, whose use will be described later.) The output of the Position Register is the 12-bit Position signal.

The output of the addition/subtraction unit, DeltaPosition, also connects to a second 12-bit register. This is the NetFwdPosition Register; the output of this 12-bit register is the 12-bit NetFwdPosition signal. PlsClk also connects to the Clock input of this register, but the Enable input is a logical combination of the CountEn, CountDn and a new signal called AtNetForward. AtNetForward (At-Net-Forward) indicates position is equal to Net Forward position. The AtNetForward signal is produced by the output of a 12-bit equality comparator that compares Position and NetFwdPosition. The logical combination of the CountEn, CountDn and AtNetForward signals is called NetForwardCntEn (pronounced "Net Forward Count Enable"). It enables the loading of the NetFwdPosition Register when CountEn is asserted, CountDn is not asserted and AtNetForward is asserted. NetForwardCntEn (Net-Forward-Count-Enable) indicates position is equal to Net Forward Position, and CountEn and CountDn indicates enabled for up counting. To summarize, the NetFwdPosition Register gets a new value only when the count is enabled for counting up and the current value of NetFwdPosition equals the current value of Position.

The preferred embodiment of the system implements a global 12-bit MaxPosition Register; this register is not shown in the figures. As shown in FIG. 3, the output of the MaxPosition Register (MaxPosition) and the output of the Encoder Position Counter (Position) are inputs to a 12-bit equality comparator; the output of the comparator is called AtMaxPosition. The FPL generates the reset input to the Position Register by using a 2-to-1 multiplexer that selects either IndexEdge or AtMaxPosition using a signal from a control register called UseIndexEdge. UseIndexEdge selects the value of Max Position or the edge of the 'index' signal to reset the position counter. The output of the multiplexer is called PositionCue; PositionCue goes into a D-flop that is clocked by PlsClk (FIG. 6). The output of the multiplexer also is the input of an inverter that then connects to the reset input of the same D-flop. The output of the D-flop connects to the asynchronous reset input of the Position Register. In this way, the assertive edge of the reset signal is synchronized to PlsClk, however, the signal becomes unasserted as soon as the selected AtMaxPosition or IndexEdge becomes unasserted.

To summarize the operation, the Encoder Position Generator receives the PhaseA, PhaseB and Index encoder signals, synchronizes them to the internal clocks, filters them, and converts them to signals to increment or decrement the Encoder Position Counter. This counter, of course, maintains the encoder position information. A second register, the MaxFwdPosition Register, only loads a new, incremented position when Position and NetFwdPosition signals are equal and the output of the addition/subtraction unit is the incremented value of the Encoder Position Counter. The output of Encoder Position Counter is constantly compared with a register that contains the highest position to count (Maximum Position). When this value is reached, the Encoder Position Counter resets to zero.

The Output Generator (FIG. 8) contains seven identical SetPoint-Pulse modules; each module generates one output signal. It also contains a SetPoint-PulseCntr module that generates one output signal, and which is very similar to a SetPoint-Pulse module except for extra circuits that implement and connect to the Repeat Pulse Generator. It should be noted that all eight modules could have been identical to the SetPoint-PulseCntr, but it was felt that this level of flexibility was unnecessary in the preferred embodiment, and the space for the extra logic was used for other features. Similarly, the Output Generator contains eight modules because the preferred embodiment has eight outputs. The number of outputs is not relevant to this invention.

Each SetPoint-Pulse module contains an Output Position Counter, a SetPoint Register with Compare, and Output Pulse Logic (FIG. 9).

The Output Position Counter (FIG. 10) is a 12-bit counter that can be cleared to zero, count up, or be loaded from the Offset Register. It uses PlsClk as the clock input and NetForwardCntEn from the Encoder Position Generator as the counter enable. The PositionCue signal, also from the Encoder Position Generator, connects to synchronous load input of the counter. However, the Output Position Counter does not clear on this signal, instead it loads the value of the output of the Offset Register. In this manner, the Output Position Counter can be "position adjusted" from the Encoder Position Counter. This adjustment may be used to achieve velocity compensation as well as other functions. The input of the 12-bit Offset Register is attached to the microprocessor data bus. The CPU loads either the lower 8-bits or the upper 4-bits at a time when the SelectOutput signal for a particular SetPoint-Pulse Module is asserted and the lower four address are 12 or 13. The Output position counter counts up only when enabled by NetForwardCntEn. The counter clears when OutputPosition equals MaxPosition. The counter loads the 'offset' value when indicated by the PositionCue signal. Note: to select the Offset registers, ADDR3 and ADDR2 are high, and ADDR1 is low.

The output of the Output Position Counter is named OutputPosition. Similar to the logic surrounding the Encoder Position Counter, OutputPosition is an input to a 12-bit equality comparator along with MaxPosition (from the Encoder Position Generator). The output of this comparator, OutputAtMaxPosition, is the input to a D-flop that also is clocked by PlsClk and enabled by NetForwardCntEn. The output of this D-flop is OutputPositionClr (Output Position Clear). OutputPositionClr connects to the asynchronous reset of the Output Position Counter. OutputAtMaxPosition is also the input to an inverter whose output is the clear input of the D-flop. Thus the asynchronous reset input of the Output Position Counter is transformed into an effective synchronous reset input.

The SetPoint Register with Compare produces an output signal SetPointMatch. See FIG. 11. This module compares the Setpoint value loaded from the 'table' registers to the Output position and generates a 'match' when the position is equal or greater. It compares the output of the Output Position Counter, OutputPosition, and output of the SetPoint Register, SetPoint. The SetPoint Register uses the SetPointMatch as the Clock Enable input. This register loads data from the lower 12-bits of the Table Register on the next PlsClk following the assertion of SetPointMatch. The signal SetPointMatch is also used to generate the ReloadRQST signal that indicates to the CPU that it needs to reload the Table Register. The Reload Table Request flag sets on Setpointmatch and clears on the first write to the Table Register. The Output Shape Logic also uses SetPointMatch. The CPU loads the 32-bit Table Register 8-bits at a time when the SelectOutput signal for a particular SetPoint-Pulse Module is asserted and the lower four address bits are 0, 1, 2 or 3. For the Table Registers, ADDR3 and ADDR2 are low. The loading of the lowest 8-bits of the Table Register causes the D-flop that generates the ReloadRQST signal to clear, negating that signal.

The Output Pulse Logic (FIG. 12) converts a 3-bit command value and a 16-bit count value into an output pulse. The logic contains the 3-bit Next Command Register followed by the 3-bit Output Command Register, the 16-bit Next Count Register followed by the 16-bit Pulse Down-Counter and the two-to-one Output Multiplexer. The 3-bit Next Command Register loads from output bits 12, 13 and 15 of the Table Registers. (Bit 14 is not used in the SetPoint-Pulse Module.) The output of this register connects to the 3-bit Output Command Register. Both "command" registers use PlsClk as the clock signal and are enabled by SetPointMatch. The two registers effectively form a pipeline to match the compare pipeline of the SetPoint Register with Compare. In other words, when the setpoint value loads into the SetPoint Register from the output of the Table Registers, the Next Command Register simultaneously loads from the output of the Table Registers. When this SetPoint signal equals the OutputPosition signal and the next SetPointMatch is asserted, the Output Command Register loads from the output of the Next Command Register.

The Output Pulse Logic also contains a 16-bit count value pipeline. The 16-bit Next Count Register also has P/sClk as the Clock input and SetPointMatch as the Enable input. Thus the Next Count Register loads from the output of the Table Registers simultaneously with the load of the Next Command Register. The 16-bit Pulse DownCounter counts down after it has been loaded with a non-zero value and continues to count down until the count value reaches zero. The carry-output signal of the counter is called CounterNotZero; it is asserted high for any counter value except zero. The data inputs are connected to the output of the Next Count Register. PlsClk connects to the Clock input. The SetPointMatch signal connects to the Load input. The counter actually decrements when one of two sources enables the count down; either the NetForwardCntEn signal or the TimerTick strobe (one microsecond period) can be selected by bit 3 of the Command Register. Thus, the Enable input of the counter is controlled by a block of logic that OR's SetPointMatch with the logical AND of CounterNotZero and the selected counter source.

To summarize the operation of the Pulse DownCounter, the counter is forced enabled to load on the next PlsClk following the assertion of SetPointMatch. When loaded with a non-zero value, the CounterNotZero signal and the selected source caused the counter to decrement on PlsClk. Bit 3 of the Command Register determines whether the counter decrements either on every TimerTick (which is once per microsecond) or every NetForwardCntEn (which is every time the encoder moves net forward). The counter continues to decrement until it reaches zero at which point the CounterNotZero signal goes low and disables the counter.

The output of each SetPoint-Pulse module comes from the Output Mux. The logic is very simple. The lower two output bits from the Command Register, bits 0 and 1, connect to the 2-to-1 Output Multiplexer. The select for the multiplexer is the CounterNotZero signal. This allows the user to select the output value when the setpoint match occurs and the output value when the Pulse DownCounter reaches zero. It should be noted that it is legal for the bits 0 and 1 of the command to be the same thereby removing any effect of the Pulse DownCounter.

FIG. 13 shows an alternate implementation of the Output Pulse Logic. This implementation, referred to as an Output Pulse Logic with Adjusted Width has a 16-bit adder between the Next Count Register and the Pulse DownCounter. Just as the Offset Register in the Output Position Counter can cause a change in the starting point of a pulse, the Width Adjust Adder can change the size of the pulse width by modifying the value of the count. This feature can also be used as part of Velocity Compensation to allow independent, on-the-fly adjustment of the pulse width. It is shown here as an alternate implementation if the velocity compensation requires modification of the pulse width. It should be pointed out that the pulse width could be increased by using the adder and a number with the most significant bit clear. As will be recognized by those familiar with binary, the pulse width can be decreased by using the adder and the two's-complement of the number (with the most significant bit set).

As noted above, the Output Generator has seven identical SetPoint-Pulse Modules, which have been described above. The eighth module, SetPoint-PulseCntr, is nearly identical to the SetPoint-Pulse module. As shown in FIG. 14, the differences are extra logic to create a Repeat Pulse Generator and some changes to the output logic creating the Output PulseCntr Logic.

The Repeat Pulse Generator in the SetPoint-PulseCntr module contains the circuitry to generate a repeat pulse with a given pulse width and pulse period. (See FIG. 15.) The section contains a 16-bit Period Counter, a 16-bit Period Width Register that can be loaded 8-bits at a time from the CPU, and a 16-bit Pulse Width Register that can be loaded 8-bits at a time from the CPU. The clock input of the Period Counter connects to the TimerTick strobe, which has a period of one microsecond. The logical OR of the StartPeriodCntr signal and the NotAtPulsePeriod signal drives the enable input of the counter. The clear input connects to PlsReset. The output of the Period Width Register, Period-Width, is one of the inputs of a 16-bit comparator. The output of the Period Counter, PeriodCount, is the other input of the comparator. The 'equal' output of the comparator is called AtPulsePeriod and drives the load input of the Period Counter. The data inputs of the counter are grounded so the counter loads a zero when AtPulsePeriod is asserted. The output of the 16-bit Width Register is called Pulse Width. A second 16-bit comparator compares the values Pulse Width and PeriodCount (output of the counter). The 'less-than' output of the comparator is called PulsePhase; it connects to logic in the Output PulseCntr Logic.

In the SetPoint-PulseCntr module, the Output PulseCntr Logic has a Command Register that is 4-bits wide. (See FIG. 16.) (The Command Register in the Output Pulse Logic has only 3 bits.) This extra bit, OutputCommand2, performs two functions. In the associated Pulse DownCounter, there are three sources for counting down instead of two. In addition to NetForwdrdCntEn and TimerTick, the assertion of OutputCommand2 selects the PulseRisingEdge signal. This signal is created from logic detecting the rising edge of the PulseEdge signal of the Repeat Pulse Generator. In the Output Mux block, OutputCommand2 changes how the output is logically created. When OutputCommand2 is low, the Output Multiplexer of the SetPoint-PulseCntr module operates the same as the SetPoint-Pulse module and uses the CounterNotZero signal to select between Command Register bits 0 and 1. When OutputCommand2 is high, however, the Output Multiplexer XORs Command Register bit 0 with the PulsePhase signal from the Repeat Pulse Generator as long as the CounterNotZero signal is high. When bit 2 is high and the CounterNotZero bit is low, the Output Multiplexer sets bit 1 of the Command Register as the output. The StartPeriodCntr signal used by the Repeat Pulse Generator is created here by the logical OR of SetPointMatch and CounterNotZero.

The Output Generator section (FIG. 8) combines all of the outputs from the Output Multiplexer blocks of each of the seven SetPoint-Pulse modules and SetPoint-PulseCntr module to form an 8-bit next output value. This value connects to an 8-bit Output Register. PlsClk connects to the clock input and P is Reset connects to the clear input of the Output Register. The output value of this register drives the electrical output circuits of the system.

The SetPoint-Event Generator, FIG. 17, is a simplified version of the SetPoint-Pulse module. The SetPoint-Event Generator contains three 8-bit Table State registers, a 12-bit EventPoint Register and a 12-bit EventPoint Compare logic. There is also an 8-bit Next Event Register and an 8-bit Event Value Register. The CPU may load the three Table State registers similar to the four registers in the SetPoint-Pulse module. The CPU may also read the value of the Event Value Register.

The SetPoint-Event Generator uses the 12-bit Position signal instead of generating its own "Event Position". The Position signal is one of the inputs of the EventPoint Compare logic; the other input comes from the output of the EventPoint Register. The output of this comparator is called EventPointMatch. The signal EventPointMatch is connected to the enable input on the EventPoint Register, the Next Event Register and the Event Value Register. PlsClk connects to the clock input of all three of these registers. Thus the assertion of EventPointMatch causes all three of these registers to load on the next rising edge of PlsClk. The EventPoint Register and the Next Event Register loads from the output of the Table Registers. The Event Value Register loads from the output of the Next Event Register. Instead of using the Position signal as one input to the EventPoint Compare, a different effect can be achieved by using the output of the Net Forward Position Register.

The assertion of EventPointMatch also causes an interrupt to the CPU by setting the output of the D-flop driving the EventRqst signal. On the interrupt, the CPU reads the Event Value Register and uses the 8-bit value to execute code unique to the generated event. In this manner, the value in the Event Value Register can create an interrupt to execute specific code upon reaching a specified encoder value. During the interrupt, the CPU reloads the Table Registers for the SetPoint-Event module; this causes the D-flop driving EventRqst to clear. The Reload Table Request flag sets on EventPointMatch and clears on the first write to the Table Register.

The use of an 8-bit Event Register in the preferred embodiment should not be considered a limiting factor of the invention, a 16-bit register or even larger could be used to select among more events are to be used to directly address the event code. Even more bits could be captured as the event to provide additional data to the event code (as well as selecting the event). In addition, the preferred embodiment may perform a logical operation or compare on the event code to inhibit the interrupt, if for example, the event code bits were all zero or all ones.

The Speed Check module, FIG. 18, measures the length of a full rotation of the encoder and compares this time with a maximum value. The result indicates whether the system is "moving" fast enough for outputs to be enabled. The module consists of a 32-bit Rotation Counter, a 32-bit Rotation Time Register and 32-bit Rotation Time Compare logic. The Rotation counter measures time in Timerticks (microseconds) between successive occurrences of Position Cue. PositionCue occurs once per encoder rotation. The rotation period in microseconds is saved in the Rotate Time Register. This value is then compared to the MaxRotateTime value. If the comparator result is 'X is less-than Y', the measure rotate period in microseconds is less the specified MaxRotateTime. If the measured period is less than the specified time, the rotational speed must be greater than the minimum. TimerTick is the clock for the Rotation Counter. The counter is always enabled except when the CountLimit signal becomes high, indicating that the counter has reached a terminal value of all one's. This signal is inverted and connects to the enable input of the counter. This prevents the counter from "rolling-over". When the PositionCue signal becomes high, it enables the loading of Rotation Time Register and it causes the Rotation Counter to clear. (Note: D-flop logic enables the clear only on the rising edge of PositionCue.) The 32-bit output of the Rotation Time Register, RotateTime is one of the inputs to the Rotation Time Compare logic; the other input is the output of the global MaxRotateTime Register (not shown). The 'less-than' output of the compare logic indicates that the current rotation time is less than the maximum specified in the register. This signal is called EncoderExceedsMinSpeed and is used to enable outputs in the output driver circuitry.

Using the Preferred Embodiment to Generate Velocity Compensated Outputs

The purpose of velocity compensation is to set an output to signal an external device to start turning on early enough so that the output is completely on by the time the encoder position reaches a selected value. There are potentially several methods to achieve this result. The classic method anticipates the encoder position by the amount of turn-on time of the device. It does this by calculating the velocity of the motion and determining the number of increments of the encoder required to equal (or slightly exceed) the turn-on time of the device. Then some technique is applied to look-ahead that many encoder increments when comparing to the next setpoint. In a software-based system, the encoder position is read and the calculated value is added to the position before the compare is performed. It should be noted that in many systems, the position is rotational and therefore has a maximum value before it "wraps" to zero. In this case, the software may need to perform a check for "overflow" after adding the velocity compensation value and before comparing to the setpoint.

In Klaes, et al., a velocity compensation value is calculated based on the current measured velocity of the encoder input. This value is added in hardware to the current encoder position (which is also generated in hardware) and then is compared to the one or more setpoint values. No mention is made in the Klaes disclosure for checking the result of the addition for overflow; i.e. there is no text describing the reaction of the system should the result of the addition produce a value greater than the maximum rotational position of the system. An argument could be made that since setpoints with values greater than the rotational maximum should not exist, there is not any need for an overflow check. However, this is precisely why an overflow check is needed. Without a check to "wrap to zero" values greater than the rotational maximum, setpoints with values near zero and less than the compensation value would never be triggered.

There are ways to fix the problems with the Klaes implementation such as by adding hardware overflow and "wrap-to-zero" logic, or by adding software to "transpose" the setpoints near zero to higher values by adding the rotational maximum and then using this value to compare in the hardware. The Klaes disclosure does not teach any of these methods. Another alternative is to use the mechanisms described in this disclosure to produce velocity compensation.

Just like Klaes, the velocity of the encoder input is measured (for example, using the Speed Check Module or similar logic) and a velocity compensation value is created. In this implementation of the invention, the velocity compensation value is calculated for each desired output. This value is then loaded into the offset register of that output. This causes the position counter associated with the output to be loaded with this offset value when the encoder position changes to zero. The hardware comparison is then conducted with the 'offset' value associated with the output and the next setpoint value associated with the output. The leading edge of the pulse is thus adjusted for velocity. Generally, this is the important change for velocity compensation. However, should the duration of the pulse need to be changed, it can be modified by software before loading it into the table. Another alternative noted above and shown in FIG. 13 places an adder before the PulseDownCounter in the Set-Point-Pulse (or SetPoint-PulseCntr) modules to separately velocity compensate the width of the pulse.

The Generality of the Invention

Using the CPU to load the next table values in each of the SetPoint-Pulse (or SetPoint-PulseCntr) modules is not a limitation of the invention and can be adjusted depending upon need and resources. It is possible to load these registers using a DMA controller, should an eight-channel controller be available or could be added to the Field Programmable Logic. Further, the implementation need not be "all of one or the other." One or more channels can be designed to reload from the DMA controller (again depending upon the number of channels available) and the remainder could be reloaded from the CPU. Or, the outputs could be reloaded from the CPU, but the SetPoint-Event Generator registers reloaded from the DMA controller. The implementation decision depends upon the expected performance needs of the system (using the DMA controller is faster) and the resource limitations. In some systems a DMA controller is not available or the DMA controller can handle only one or two independent requests.

To further insure independence of the invention from the logic used to reload the new information, this invention contemplates yet another method for getting the new information to the Table Registers after a match. The entire table of information, including next setpoint, next output, and optionally next timer values, could come from an independent memory that is directly embedded with the logic. Of the off-the-shelf microprocessor/FPLD combined devices available, several of them have memory blocks in the logic. In this type of implementation, all of the information is loaded into this "logic cell" memory through one of the commonly used means, and then the information is accessed sequentially with a counter. The counter is incremented one or more times every time there is a "setpoint match", which allows the next set of table data to be loaded in parallel or one piece at a time from the memory into the Table Registers.

Other embodiments will occur to those skilled in the art and are within the following claims.

What is claimed is:

1. A programmable controller for controlling an output state based on position indicated from a position transducer, comprising:
    an interface to the position transducer that converts the transducer signals into a change in position;
    a transducer position counter that accumulates the change in transducer position;
    a net forward position counter that accumulates the net forward position;
    means for comparing the value of the net forward position counter and the value of the transducer position counter;
    means for updating the transducer position counter when the transducer signals indicate a change of position; and
    means for updating the net forward position counter when the value of the net forward position counter and the value of the transducer position counter are equal and the transducer interface indicates a forward movement.

2. The programmable controller of claim 1, further comprising means for disabling an output state when the transducer position does not match the net forward position.

3. The programmable controller of claim 1, in which the transducer interface further converts the transducer signals into an index signal that occurs once per cycle in a repetitive operation cycle.

4. The programmable controller of claim 3, further comprising means for setting the transducer position counter and the net forward position counter to zero when the index signal is detected and the transducer interface indicates a forward movement.

5. The programmable controller of claim 4, further comprising means for setting a maximum position value, and comparison means for comparing the transducer position to the maximum position value.

6. The programmable controller of claim 5, further comprising means for setting the transducer position counter to the maximum position value when the transducer position is zero and the transducer interface indicates a reverse movement.

7. The programmable controller of claim 1, further comprising means for setting a maximum position value, and comparison means for comparing the transducer position to the maximum position value.

8. The programmable controller of claim 7, further comprising means for setting the transducer position counter and the net forward position counter to zero when the transducer position is equal to the maximum position value and the transducer interface indicates a forward movement.

9. The programmable controller of claim 8, further comprising means for setting the transducer position counter to the maximum position value when the transducer position is zero and the transducer interface indicates a reverse movement.

10. A programmable controller for controlling an output state based on position indicated from a position transducer, comprising:
    an interface to the position transducer that converts the position transducer signals into a change in position;
    a storage means for storing the position indicated from the position transducer;
    a storage means for storing the net forward position;
    comparison means for comparing the stored value of the net forward position and the stored value of the position indicated from the position transducer;
    logic means for adding or subtracting the change in position to or from the position indicated from the position transducer;
    logic means for updating the storage means of the position indicated from the position transducer with the result of the addition or subtraction; and
    logic means for updating the storage means of the net forward position with the result of the addition when the stored value of the net forward position and the stored value of the position indicated from the position transducer are equal and the transducer interface indicates a forward movement.

11. The programmable controller of claim 10, in which the transducer interface further converts the transducer signals into an index signal that occurs once per cycle in a repetitive operation cycle.

12. The programmable controller of claim 11, further comprising means for setting the transducer position storage means and the net forward position storage means to zero when the index signal is detected and the transducer interface indicates a forward movement.

13. The programmable controller of claim 10, further comprising means for setting a maximum position value, and means for comparing the position indicated from the position transducer to the maximum position value.

14. The programmable controller of claim 13, further comprising means for setting the transducer position storage means and the net forward position storage means to zero when the position indicated from the position transducer is equal to the maximum position value and the transducer interface indicates a forward movement.

15. The programmable controller of claim 14, further comprising means for setting the transducer position storage means to the maximum position value when the position indicated from the position transducer is zero and the transducer interface indicates a reverse movement.

16. A programmable controller, comprising means for controlling an output state based on position indicated from a position transducer, and means for signaling the occurrence of an event to an external device based on position indicated from the position transducer.

17. A programmable controller having a programmable processor, the controller for controlling an output state based on position indicated from a position transducer, comprising:
    an interface to the position transducer that converts the transducer signals into a change in position;
    means for accumulating the changes in position and storing the resulting position indicated from the position transducer;
    means for storing a selected position value;

means for comparing the selected position value with the stored position indicated from the position transducer; and means, responsive to the means for comparing, for signaling the programmable processor when the selected position value is equal to the position indicated from the position transducer.

18. The programmable controller of claim 17, further comprising:

means for storing a selected event value; and the programmable processor comprising means for reading the selected event value.

19. The programmable controller of claim 17, further comprising means for reloading a new selected position value after the selected position value and the transducer value are equal and the programmable processor has been signaled.

20. A programmable controller for controlling an output state based on position indicated from a position transducer, comprising:

an interface to the position transducer that converts the transducer signals into a change in position;

a counter that accumulates the change in transducer position;

means for updating the counter when the transducer signals indicate a change of position;

means for storing a selected position value;

means for comparing the selected position value with the stored position indicated from the position transducer;

delay means for creating a time delay;

means for storing the value of the time delay, means for loading the value of the time delay with a specified delay and beginning the delay when the selected position value matches the position indicated from the position transducer;

means for changing the output value when the selected position matches the stored position indicated from the position transducer; and means for changing the output value when the time delay completes.

21. The programmable controller of claim 20, further comprising means for storing two output values; and means for outputting the first output value when the selected position matches the stored position indicated from the position transducer, and for outputting the second output value when the time delay completes.

22. The programmable controller of claim 20, further comprising a timer and an output value pair for each output of the controller.

23. A programmable controller for controlling an output state based on position indicated from a position transducer, comprising:

an interface to the position transducer;

a master-position counter;

one or more offset-position counters;

means for defining a maximum position value;

means for indicating when the master-position counter has reached the maximum position value;

means for storing one offset value for each offset-position counter; and means for loading the stored offset value of each offset-position counter when the master-position counter has reached its maximum value.

24. The programmable controller of claim 23, further comprising:

means for indicating the next setpoint position to change the output;

means for comparing the value in the master-position counter or one of the offset-position counters with the value of the setpoint position and indicating a match if the two values are equal;

means for indicating a next-output value to be set when a match occurs; and an output driver for producing an output state from the next output value when the match occurs.

25. A programmable controller for controlling an output state during a repetitive operation cycle using generated output signals, comprising:

a hardware timer for measuring the period of the repetitive operation cycle;

means for specifying a maximum cycle value; and compare logic for disabling the output signals when the measured period is greater than the maximum cycle value.

26. The programmable controller of claim 25, further comprising means for specifying a minimum cycle value, wherein the compare logic disables the outputs when the measured period is greater than the maximum cycle value or less than the minimum cycle value.

27. A programmable controller for controlling an output state based on position indicated from a position transducer, comprising:

an interface to the position transducer that converts the transducer signals into a change in position;

a counter that accumulates the change in transducer position;

means for updating the counter when the transducer signals indicate a change of position;

means for storing a selected position value;

means for comparing the selected position value with the stored position indicated from the position transducer;

delay means for creating a positional delay based on change in position;

means for storing the value of the positional delay, means for loading the value of the positional delay with a specified delay and beginning the delay when the selected position value matches the position indicated from the position transducer.

28. The programmable controller of claim 27, further comprising means for changing the output value when the selected position matches the stored position indicated from the position transducer, and means for changing the output value when the position delay completes.

29. The programmable controller of claim 27, further comprising means for storing two output values; and means for outputting the first output value when the selected position matches the stored position indicated from the position transducer, and for outputting the second output value when the time delay completes.

* * * * *